US005537156A

United States Patent [19]

Katayama

[11] Patent Number: 5,537,156

[45] Date of Patent: Jul. 16, 1996

[54] FRAME BUFFER ADDRESS GENERATOR FOR THE MULITPLE FORMAT DISPLAY OF MULTIPLE FORMAT SOURCE VIDEO

[75] Inventor: Andrew S. Katayama, Cardiff-by-the-Sea, Calif.

[73] Assignee: Eastman Kodak Company, Rochester, N.Y.

[21] Appl. No.: 217,408

[22] Filed: Mar. 24, 1994

[51] Int. Cl.$^{6}$ ................................ H04N 5/76; H04N 9/64

[52] U.S. Cl. .......................... 348/716; 348/714; 395/166; 395/412; 364/245

[58] Field of Search ............................. 358/335; 348/231, 348/714, 715, 716, 718; 364/245, 245.4, 245.5; 395/164, 165, 166, 400, 425, 139; H04N 5/76, 9/64

[56] References Cited

U.S. PATENT DOCUMENTS

| | | | |
|---|---|---|---|
| 4,533,952 | 8/1985 | Normann, III | 358/160 |
| 4,675,842 | 6/1987 | Szenes et al. | 364/900 |
| 4,755,810 | 7/1988 | Knierim | 340/726 |
| 4,790,025 | 12/1988 | Inoue et al. | 382/41 |
| 4,833,625 | 5/1989 | Fisher et al. | 395/139 |
| 4,872,001 | 10/1989 | Netter | 340/721 |
| 4,928,253 | 5/1990 | Yamauchi et al. | 364/521 |
| 4,951,229 | 8/1990 | DiNicola et al. | 364/521 |
| 4,967,274 | 10/1990 | Somoda | 358/160 |
| 5,134,695 | 7/1992 | Ikeda | 395/425 |
| 5,140,436 | 8/1992 | Blessinger | 358/335 |

*Primary Examiner*—James J. Groody
*Assistant Examiner*—Cheryl Cohen
*Attorney, Agent, or Firm*—William F. Noval

[57] ABSTRACT

A video imaging system having an image memory for storing a plurality of image frames and a video display having a matrix of pixels. Apparatus generates addresses for accessing pixels stored in the image memory to be displayed on the video display. The address generating apparatus includes a programmable mapping memory for storing a pixel descriptor of each pixel to be displayed on the video display, each pixel descriptor including a pixel group identification field which identifies a group of pixels on the video display, and an address field which includes address information of the image memory of pixels to be displayed. An address manager and a control causes each pixel descriptor read out of the mapping memory to be processed according to its pixel group to effect multiple format display of multiple format source video.

4 Claims, 17 Drawing Sheets

| ADDR:PIXEL | DESCRIPTOR:x,y ID:ADDR | FIELD | ADDR:PIXEL | DESCRIPTOR:x,y ID:ADDR | FIELD |
|---|---|---|---|---|---|
| 0 | :0:000000 | 0,0 | 32 | :3:000000 | 0,4 |
| 1 | :0:000010 | 1,0 | 33 | :3:010000 | 1,4 |
| 2 | :1:000010 | 2,0 | 34 | :3:100000 | 2,4 |
| 3 | :1:000011 | 3,0 | 35 | :3:110000 | 3,4 |
| 4 | :2:000000 | 4,0 | 36 | :4:000101 | 4,4 |
| 5 | :2:000001 | 5,0 | 37 | :4:000101 | 5,4 |
| 6 | :2:000010 | 6,0 | 38 | :4:000110 | 6,4 |
| 7 | :2:000011 | 7,0 | 39 | :4:000110 | 7,4 |
| 8 | :0:001000 | 0,1 | 40 | :3:000100 | 0,5 |
| 9 | :0:001010 | 1,1 | 41 | :3:010100 | 1,5 |
| 10 | :1:000110 | 2,1 | 42 | :3:100100 | 2,5 |
| 11 | :1:000111 | 3,1 | 43 | :3:110100 | 3,5 |
| 12 | :2:000100 | 4,1 | 44 | :4:000101 | 4,5 |
| 13 | :2:000101 | 5,1 | 45 | :4:000101 | 5,5 |
| 14 | :2:000110 | 6,1 | 46 | :4:000110 | 6,5 |
| 15 | :2:000111 | 7,1 | 47 | :4:000110 | 7,5 |
| 16 | :1:001000 | 0,2 | 48 | :3:001000 | 0,6 |
| 17 | :1:001001 | 1,2 | 49 | :3:011000 | 1,6 |
| 18 | :1:001010 | 2,2 | 50 | :3:101000 | 2.6 |
| 19 | :1:001011 | 3,2 | 51 | :3:111000 | 3,6 |
| 20 | :2:001000 | 4,2 | 52 | :4:001001 | 4,6 |
| 21 | :2:001001 | 5,2 | 53 | :4:001001 | 5,6 |
| 22 | :2:001010 | 6,2 | 54 | :4:001010 | 6,6 |
| 23 | :2:001011 | 7,2 | 55 | :4:001010 | 7,6 |
| 24 | :1:001100 | 0,3 | 56 | :3:001100 | 0,7 |
| 25 | :1:001101 | 1.3 | 57 | :3:011100 | 1,7 |
| 26 | :1:001110 | 2,3 | 58 | :3:101100 | 2,7 |
| 27 | :1:001111 | 3,3 | 59 | :3:111100 | 3,7 |
| 28 | :2:001100 | 4,3 | 60 | :4:001001 | 4,7 |
| 29 | :2:001101 | 5,3 | 61 | :4:001001 | 5,7 |
| 30 | :2:001110 | 6,3 | 62 | :4:001010 | 6,7 |
| 31 | :2:001111 | 7,3 | 63 | :4:001010 | 7.7 |

| | PIX GRP 0 | PIX GRP 1 | PIX GRP 2 | PIX GRP 3 | PIX GRP 4 |
|---|---|---|---|---|---|
| MASK REGISTER | 110000 | 110000 | 110000 | 000011 | 110000 |
| DELTA REGISTER | 010000 | 010000 | 000000 | 000001 | 110000 |
| SUM REGISTER | 000000 | 000000 | 100000 | 000011 | 010000 |

ORIGINAL REGISTER VALUES

| | PIX GRP 0 | PIX GRP 1 | PIX GRP 2 | PIX GRP 3 | PIX GRP 4 |
|---|---|---|---|---|---|
| MASK REGISTER | 110000 | 110000 | 110000 | 000011 | 110000 |
| DELTA REGISTER | 010000 | 010000 | 000000 | 000001 | 110000 |
| SUM REGISTER | 000000 | 000000 | 100000 | 000011 | 010000 |

AFTER FRAME 1

| | PIX GRP 0 | PIX GRP 1 | PIX GRP 2 | PIX GRP 3 | PIX GRP 4 |
|---|---|---|---|---|---|
| MASK REGISTER | 110000 | 110000 | 110000 | 000011 | 110000 |
| DELTA REGISTER | 010000 | 010000 | 000000 | 000001 | 110000 |
| SUM REGISTER | 010000 | 010000 | 100000 | 000011 | 000000 |

AFTER FRAME 2

| | PIX GRP 0 | PIX GRP 1 | PIX GRP 2 | PIX GRP 3 | PIX GRP 4 |
|---|---|---|---|---|---|
| MASK REGISTER | 110000 | 110000 | 110000 | 000011 | 110000 |
| DELTA REGISTER | 010000 | 010000 | 000000 | 000001 | 110000 |
| SUM REGISTER | 100000 | 100000 | 100000 | 000000 | 110000 |

AFTER FRAME 3

| | PIX GRP 0 | PIX GRP 1 | PIX GRP 2 | PIX GRP 3 | PIX GRP 4 |
|---|---|---|---|---|---|
| MASK REGISTER | 110000 | 110000 | 110000 | 000011 | 110000 |
| DELTA REGISTER | 010000 | 010000 | 000000 | 000001 | 110000 |
| SUM REGISTER | 110000 | 110000 | 100000 | 000001 | 100000 |

AFTER FRAME 4

| | PIX GRP 0 | PIX GRP 1 | PIX GRP 2 | PIX GRP 3 | PIX GRP 4 |
|---|---|---|---|---|---|
| MASK REGISTER | 110000 | 110000 | 110000 | 000011 | 110000 |
| DELTA REGISTER | 010000 | 010000 | 000000 | 000001 | 110000 |
| SUM REGISTER | 000000 | 000000 | 100000 | 000010 | 010000 |

FIG. 12

FRAME BUFFER ADDRESS GENERATOR FOR THE MULITPLE FORMAT DISPLAY OF MULTIPLE FORMAT SOURCE VIDEO

FIELD OF THE INVENTION

This invention relates in general to video recording and reproducing apparatus and relates more particularly to a frame buffer address generator for the multiple format display of multiple format source video.

BACKGROUND OF THE INVENTION

The display of video from a frame buffer, in general, requires the generation of at least one address per displayed pixel at a rate determined, (1) by the update rate of the display, (2) by the display resolution, and (3) by the number of color components per pixel. Because it is beyond the update rate and resolution capabilities of a microprocessor, the generation of addresses for the frame buffer is typically implemented either in custom hardware or in an 'off-the-shelf' CRT (Cathode Ray Tube) Controller I.C. (Integrated Circuit).

In video imaging systems, which include a solid state multi-channel sensor and solid state memory (such as disclosed in commonly assigned U.S. Pat. No. 5,140,436, issued Aug. 18, 1992, inventor Blessinger), the sensor(s) used in the imaging system and the solid state memory locations in which the video data is stored are tightly-coupled. This is because the number of simultaneous data paths which need access to the frame buffer (solid state memory) are set both by the number of sensor(s) as well as the number of channels within the sensor(s). To accommodate this, frame buffers are implemented with a variety of techniques, such as (1) routing the sources amongst several frame buffer boards, and (2) routing individual sources to separate bits of a wide-word frame buffer board. In either case, the locations where the video data is eventually stored is usually driven by the sensor(s) in the system.

In the display side of a video capture imaging system, display capabilities are typically limited to a small subset of possible formats, due to the complex nature of the organization of the source images in the frame buffer. Additionally, such display subsystems are typically limited to a narrow subset of imagers, and in many cases only one. However, more versatility is obtained by composing the images via a microprocessor, at the expense of limiting update rates to virtually a still-frame rate. In either case, the end result are display systems which are more 'imager-oriented' rather than 'display-oriented'. Such display systems thus fail to accommodate many useful display organizations.

The role of the 'off-the-shelf' CRT Controller I.C. in the generation of frame buffer addresses in a video system is very well defined. Some observations are as follows:

*The CRT Controller typically will generate a series of addresses for each displayed raster at a rate which is lower than the pixel update rate of the display system. Thus, the display system will typically address multiple pixels for each generated address. This limits the minimum word size for the frame buffer. This also forces physically adjacent pixels on the display to be in the same word of the frame buffer.

*The progression of the generated addresses within a raster is typically set to increment by fixed amounts. This limits the ability to accommodate imager structures which involve multiple channels per raster. Additionally, it limits the display to the most basic of modes, usually magnification and reduction, as well as image displacement.

*The number of logical screens which can be supported within the display are limited by the design of the CRT Controller.

The CRT Controller is therefore not well suited for the generation of physical frame buffer addresses, but is best utilized in the generation of logical display addresses.

Although the generation of frame buffer addresses by means of custom hardware provides the speed necessary to handle both a high update rate and high display resolution, in addition to accommodating specific imager architectures, it does so at the expense of display flexibility.

The above addresses an inherent lack of flexibility in the spatial organization of the displayed image, but there is also a similar lack of flexibility in the temporal nature of how addresses are generated by existing display systems. The ability to display multiple logical screens within the display which have different temporal characteristics can be used to help in the analysis of recorded events. A logical screen is a preselected pixel region of the display. For example, if the display is 512×512 pixels, a logical screen could have a smaller pixel region, e.g., 256×256 pixels. Other logical screens could be the same or smaller size.

For instance, one may want to display both a fixed frame in one logical screen simultaneously with another logical screen containing a sequenced playback of images from the frame buffer, allowing the user to subjectively compare the two screens. Another application would be the playback of the same session in two logical screens at the same playback rate, with a temporal offset between the two screens. This can be used to look for any autocorrelative features within the recorded event. Alternatively, by using the previous technique but directing the logical screens at two different imagers, cross-correlative features can also be displayed to advantage.

The following patents disclose various video display addressing techniques which do not provide the capability of multiple format display of multiple format sources.

U.S. Pat. No. 4,967,274, issued Oct. 30, 1990, discloses an image data conversion device having an image data memory for storing and outputting picture element data to a DMA transmission system;

U.S. Pat. No. 4,533,952, issued Aug. 6, 1985, inventor Norman, discloses a video special effects processing system for superimposing a key video picture on a reference video picture;

U.S. Pat. No. 4,675,842, issued Jun. 23, 1987, inventor Szenes, discloses an apparatus for the display and storage of television picture information by using a dynamic random access memory accessible from a computer;

U.S. Pat. No. 4,790,025, issued Dec. 6, 1988, inventor Inoue, discloses a processing method of image data, which divides an image into a plurality of sections and subjecting the thus divided images to an image processing in limited memory space;

U.S. Pat. No. 4,755,810, issued Jul. 5, 1988, inventor Knierim, discloses a frame buffer memory having facilitated rapid scrolling of raster displays in either vertical or horizontal directions;

U.S. Pat. No. 4,951,229, issued Aug. 21, 1990, inventor Di Nicola, discloses a memory device having a plurality of addressable memory locations, each of which can be defined uniquely by an address having an X component and a Y component;

U.S. Pat. No. 4,872,001, issued Oct. 3, 1989, inventor Netter, discloses a split screen imaging system including interactive controls operating on random access memories for designating subdisplay images on a split screen;

U.S. Pat. No. 4,928,253, issued May 22, 1990, inventor Yamauchi, discloses the sequential display of images from an image memory to a display memory under control of a host computer and a reprocessing unit to solve the problem of fast image read in and slow read out.

There is thus a problem in the prior art to provide a hardware display sub-system which is configurable to handle a flexible 'display-oriented' description of the desired image, while at the same time being capable of handling the various imagers which may be simultaneously connected to the video system.

SUMMARY OF INVENTION

According to the present invention there is provided a solution to such a problem which will not only allow the implementation of traditionally used display formats in a time-efficient manner, but also allow for the possibility of new and alternative means of presenting video data through the use of a programmable hardware sub-system which allows for the flexible generation of frame buffer addresses.

According to an aspect of the present invention there is provided a video imaging system comprising:

an image memory for storing a plurality of images, wherein each of said images has a plurality of pixels;

a video display having a matrix of pixels;

a programmable address generator for producing a user defined sequence of display frames, each of which includes an ordered set of pixels from said image memory, and which is characterized by an ordered set of addresses, one for each display pixel, and an ordered set of pixel group identifiers, one for each display pixel;

wherein said address generator includes a) a programmable mapping memory for storing a pixel descriptor of each display pixel of a display frame, said pixel descriptor including a pixel group identification field, which identifies a group of pixels of said video display, and an address field which includes address information of said image memory of pixels to be displayed; and b) an address manager, which is linked to said mapping memory and said video display, and which has a set of registers and logic circuitry corresponding to each of said pixel groups of said mapping ram and said display, wherein each said set of registers includes a sum register, a delta register, and a mask register register, the collective function of each said sets of registers and corresponding logic circuitry being to modify the address field of a pixel descriptor from said mapping memory to retrieve an image pixel stored in said image memory for display on said video display; and a control for controlling said video imaging system to sequentially read out said pixel descriptors from said mapping memory, and to process said address field of each read out pixel descriptor, by the pixel group set of registers and logic circuitry of said address manager, which corresponds to the pixel group identifier of said processed pixel descriptor, a) in a display mode, in which the mask register specifies bits of the address field, which may or may not be contiguous, to be modified, by adding the masked bits of the address field of the pixel descriptor to the respective bits of the sum register, by which process a modified address field is generated, whose unmasked bits are composed of the original and respective bits of the address field, and whose masked bits are generated as a result of the latter process; and b) in a frame advance mode in which the mask register specifies bits of the sum register, which are contiguous or not, to be modified, wherein the masked bits of the sum register are added to the respective bits of the delta register, to generate a modified value, whose unmasked bits are composed of the original address field bits and respective bits of the sum register, and whose masked bits are generated by the latter process.

BRIEF DESCRIPTION OF THE DRAWINGS

FIGS. 6–12 are diagrammatic views illustrating an example of the implementation of the present invention.

DESCRIPTION OF THE PREFERRED EMBODIMENTS

Figure 1:
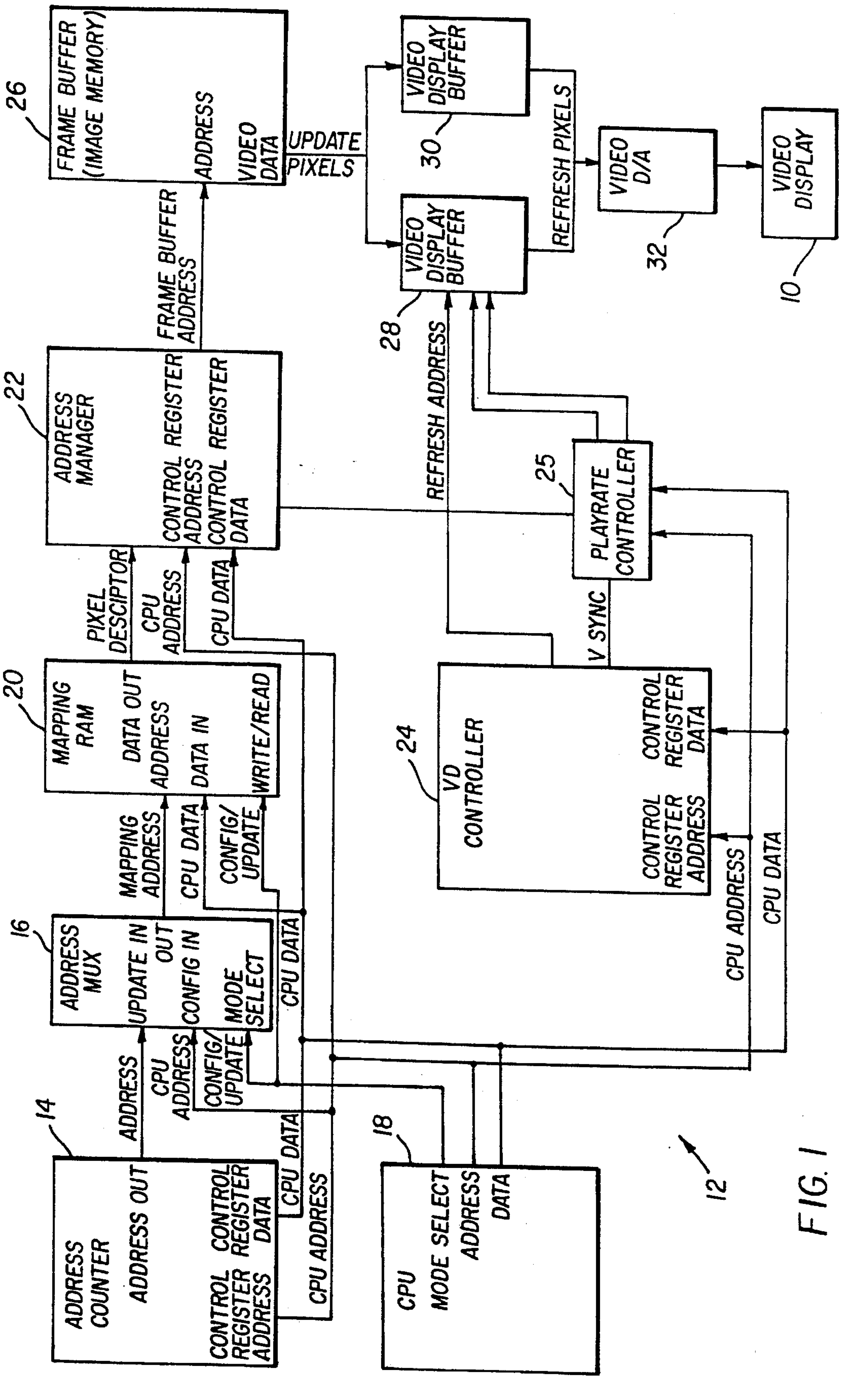
FIG. 1 is a block diagram of a preferred embodiment of address generator according to the present invention.

Referring now to FIG. 1 there is shown a preferred embodiment of the present invention. As shown, the display on a video display 10 is controlled by an address generator 12. Address generator 12 includes an address counter 14, an address mux (multiplexer) 16, a central processing unit (cpu) 18, a mapping ram (random access memory) 20, an address manager 22, a video display (VD) controller 24, a frame buffer 26, video display buffers 28 and 30, and video D/A (digital-to-analog converter) 32.

The VD CONTROLLER 24 is only responsible for generating logical display addresses (i.e., the address which is output by the VD Controller 24 directly encodes the row and column coordinates of the displayed screen). Therefore, regardless of the display mode of video display 10 desired, so long as the same area of screen is utilized, there needs to be no reprogramming of the controller 24. Any change needed in terms of the area to be displayed is easily accomplished within the capabilities of existing VD Controllers 24.

The addresses generated by VD controller 24 are connected only to the VIDEO DISPLAY BUFFERS 28, 30. Any complex display mapping is done in the way the data is written into one of the VIDEO DISPLAY BUFFERS 28,30, not by how the data is read out of the other of VIDEO DISPLAY BUFFERS 28,30.

There is a separate ADDRESS COUNTER 14 which simply increments through the addresses of MAPPING RAM 20. The counter 14 is connected to the address lines of the MAPPING RAM 20 via an ADDRESS MUX 16. The ADDRESS MUX 16 allows the CPU 18 to also access the MAPPING RAM 20 for initial configuration. During screen updates of video display 10, however, the ADDRESS COUNTER 14 generates its addresses for the MAPPING RAM 20, causing the data stored in successive locations in the MAPPING RAM 20 to be fetched.

During configuration, the CPU 18 writes to the MAPPING RAM 20 to obtain the desired display characteristic. Of course to do this, the CPU 18 must know which address in the MAPPING RAM 20 to access, and what the data should be at this location. The address is determined solely by the specific pixel location on the display which needs to be described. The data, on the other hand, is solely determined by how the pixels (i.e., the plural is used, even though only one screen location is referred to, as the pixel descriptor stored as data in the MAPPING RAM 20 refers to multiple temporal pixels) to be displayed at this screen location are addressed in the FRAME BUFFER 26.

The data read from the MAPPING RAM 20 is then passed to the ADDRESS MANAGER 22, which ultimately generates an address for the frame buffer 26. Registers within the ADDRESS MANAGER 22 also control the temporal characteristics of each pixel described in the MAPPING RAM 20. (Each displayed pixel location is assigned a group number (logical screen) in the MAPPING RAM 20). Each group is then configured for a specific temporal characteristic via registers in the ADDRESS MANAGER 22. (The total number of groups or logical screens is implementation specific.) The registers are initialized by the CPU 18 during configuration via the CONTROL REGISTER ADDRESS and CONTROL REGISTER DATA ports 29 and 31, respectively, of the ADDRESS MANAGER 22. At the end of each frame, the ADDRESS MANAGER 22 adjusts the value stored in its registers in preparation for the next displayed frame.

The addresses thus generated are used to obtain the video data from the FRAME BUFFER 26, which is stored into one of the VIDEO DISPLAY BUFFERS 28,30. Upon completion of an entire frame transfer, the one of VIDEO DISPLAY BUFFERS 28,30 being written into, switches roles with the other of VIDEO BUFFERS 28,30 which is being read out of. The read out pixel data is sent to the video D/A 32 for display refresh of video display 10.

By this architecture, the layout of the display screen of video display 10 can be determined on a pixel-by-pixel level by modifying the appropriate address of the MAPPING RAM 20. The locations where all of the pixels which occupy a particular display location (Logical Screen) in time is described by the data stored at the above address. Finally, the temporal characteristics of these pixels is determined solely by the programming of the ADDRESS MANAGER 22 registers.

Figure 2:
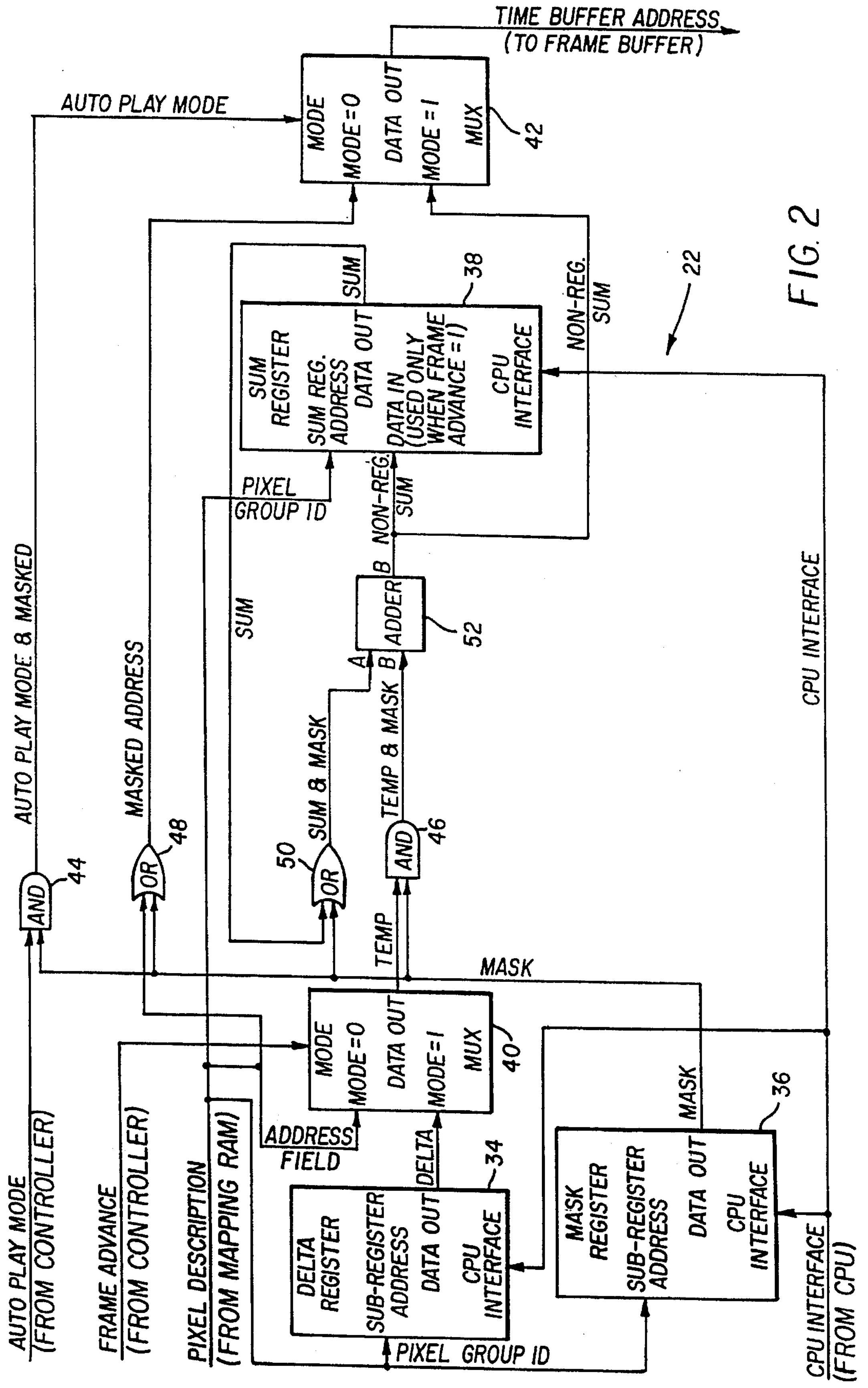
FIG. 2 is a block diagram of an address manager used in the embodiment of FIG. 1.
Figure 2A:
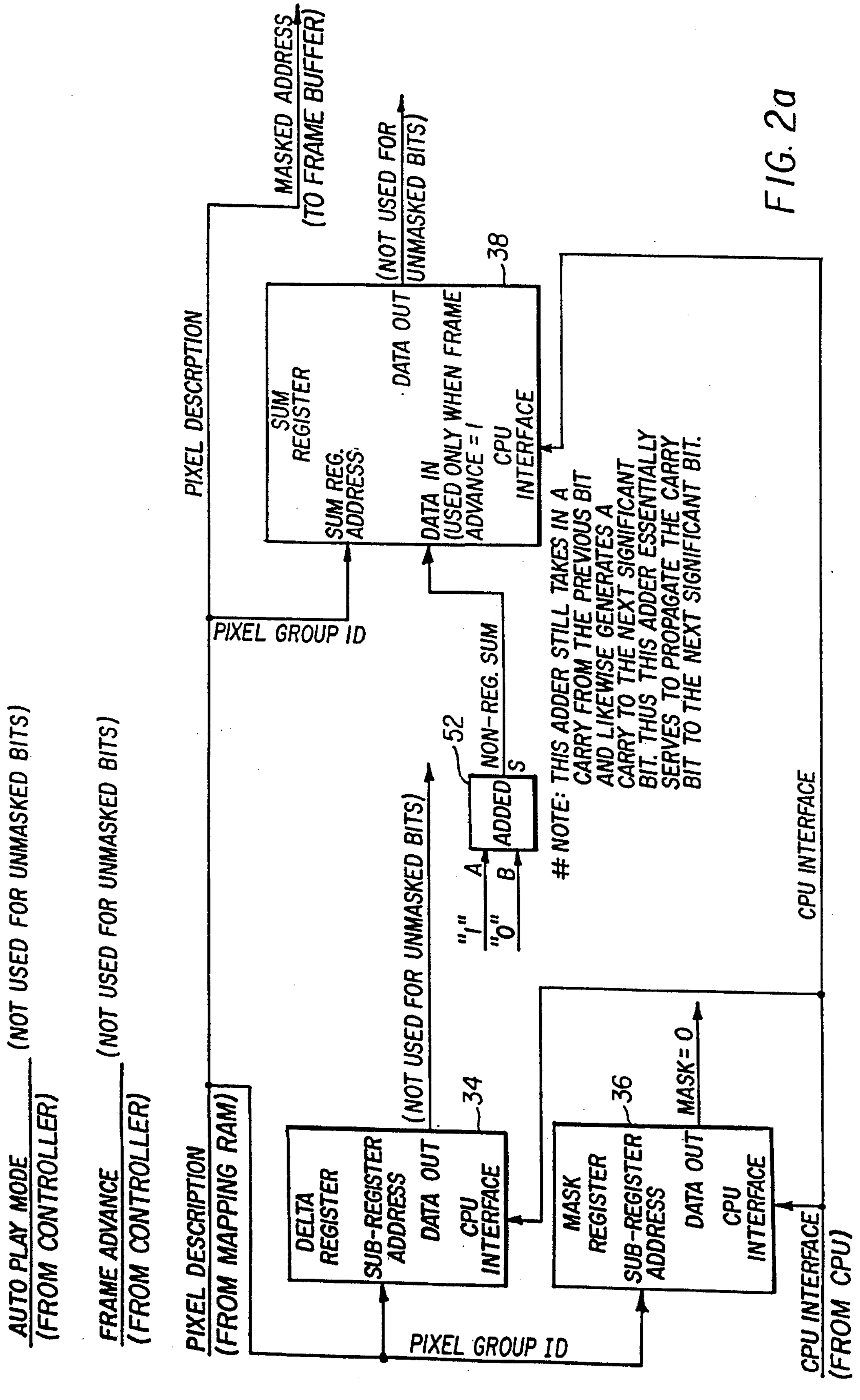
FIGS. 2*a* and 2*b* are degenerate versions of the address manager of FIG. 2 useful in explaining the operation thereof.
Figure 2B:
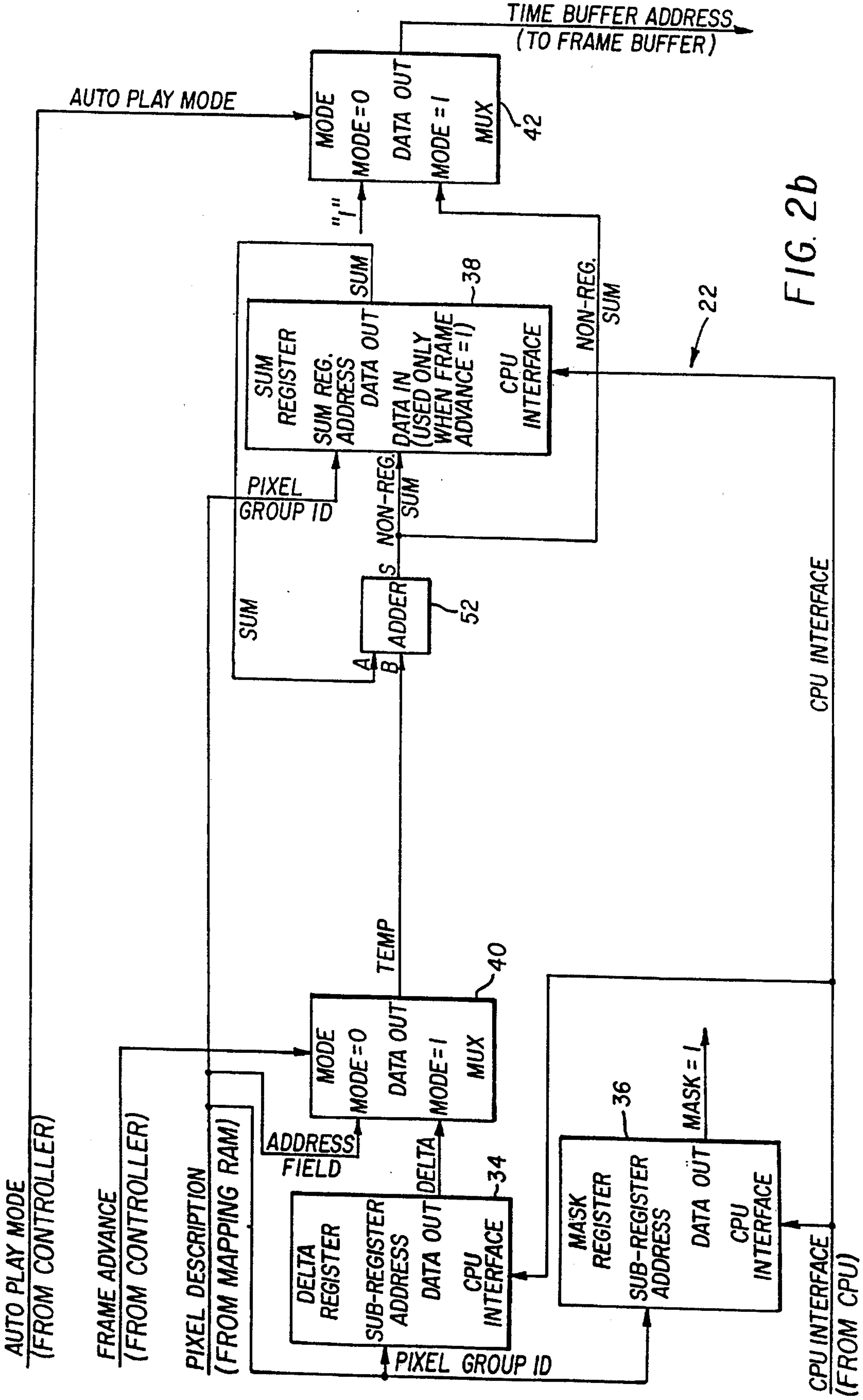

Referring now to FIG. 2, there is shown a preferred embodiment of address manager 22. As shown, address manager 22 includes delta register 34, mask register 36, sum register 38, mux 40, mux 42, AND gates 44 and 46, OR gates 48 and 50, and adder 52. It will be understood that the address manager circuit of FIG. 2 will be provided for each pixel group-Logical Screen selected for display on the screen of video display 10. The function and operation of the components of address manager 22 will be described in greater detail later in conjunction with FIGS. *2a–5b*.

MAPPING RAM AND ADDRESS COUNTER

The MAPPING RAM 20 stores PIXEL DESCRIPTORs for each physical pixel location on the display screen of video display 10. As the display 10 is being updated, the ADDRESS COUNTER 14 generates the addresses necessary to access these pixel descriptors in the usual rasterized format. The fetched pixel descriptors are then sent to the ADDRESS MANAGER 22 for the final FRAME BUFFER

26 address generation. Thus, the function of the ADDRESS COUNTER 14 and the MAPPING RAM 20 is very straight forward.

For increased flexibility in the system, multiple banks of MAPPING RAM 20 can be implemented, each of which is selected by the CPU 18 for use in a frame update cycle. In this manner, multiple display formats can be programmed by the CPU 18, with the ability to instantly switch between them.

The actual programming requirements for the MAPPING RAM 20 is covered later. The following is an overview and elaboration of some items discussed.

PIXEL DESCRIPTORs

The PIXEL DESCRIPTORs stored in the MAPPING RAM 20 contain two major fields. They are the PIXEL GROUP ID and the ADDRESS FIELD. The PIXEL GROUP ID associates each display pixel as belonging to a PIXEL GROUP or logical screen. As the number of pixel groups in a system is implementation dependent, so is the size of this field. However, it must be at least the nearest whole integer greater to or equal to log(# pixel groups ), base 2. The ADDRESS FIELD associates each display pixel with a generalized FRAME BUFFER 26 address. By generalized, it is meant that it is a description of the possible FRAME BUFFER 26 addresses that will be accessed by this pixel, rather than a specific and fixed address. The missing information needed to generate a specific FRAME BUFFER 26 address will be supplied by the ADDRESS GENERATOR 12. This field is also implementation dependent, but will equal the address width of the FRAME BUFFER 26 itself. Thus, if the system's FRAME BUFFER 26 takes a 32 bit address word, the ADDRESS FIELD portion of the PIXEL DESCRIPTOR will be 32 bits as well.

PIXEL DESCRIPTOR:PIXEL GROUP I.D

The PIXEL GROUP ID field, as discussed above, associates each display pixel of video display 10 with a PIXEL GROUP or logical screen and thereby, a given pixel with a defined temporal characteristic, as well as the possible addresses of FRAME BUFFER 26 that it will be associated with. As will be explained later the PIXEL GROUP ID field activates a dedicated set of registers within the ADDRESS MANAGER 22, unique for each implemented PIXEL GROUP. It will be appreciated that each pixel group has its own set of registers.

Generally speaking, a pixel needs to be identified with a unique PIXEL GROUP ID if:

*The addressing scheme for that pixel is different from the other pixels, as might happen in a multi-imager system; or

*If the temporal nature for that pixel is different from the other pixels, as might happen when one window on the display plays at a different playback rate than another displayed window; or

*If the quantity which is being changed between frames for that pixel is different from the other pixels, as might happen when one window increments by frame number, while another window increments by row number.

PIXEL DESCRIPTOR:ADDRESS FIELD

The ADDRESS FIELD of the PIXEL DESCRIPTOR contains some generalized addressing information for a given display pixel. The missing information is filled out by the ADDRESS MANAGER 22 via information stored in its registers under the respective PIXEL GROUP ID.

PIXEL DESCRIPTOR SUMMARY

In summary, it is important to note a few key aspects of the PIXEL DESCRIPTORs.

*There is a one-to-one correspondence between pixels on the display of video display 10, and a PIXEL DESCRIPTOR entry in the MAPPING RAM 20.

*The PIXEL DESCRIPTORs only need to be reprogrammed when the basic layout of the display of video display 10 is altered.

*Most changes in the display of video display 10 , such as a different frame rate (simulated by changing the DELTA value) or a different offset between successively displayed frames, are readily handled by just a reprogramming of the appropriate control register within the ADDRESS MANAGER 22.

*The way the PIXEL GROUPs are allocated is completely up to the programmer. One PIXEL GROUP can be dedicated to each window within the display, or one PIXEL GROUP can be used for multiple windows displaying the same imager type or video data source.

*Multiple imager or video data source formats can be handled by assigning a unique PIXEL GROUP to each imager or video data source requiring a different format in the FRAME BUFFER 26.

*The temporal characteristics of a specific PIXEL GROUP can be altered as quickly as the CPU 18 can alter the PIXEL GROUP's associated registers.

*The spatial layout of the display of video display 10 is completely independent of the content or complexity of the display.

*By the appropriate use of the ADDRESS MANAGER 22 registers, one is not limited to incrementing by frame number. Rather, frame incrementing can be any quantity defined by an arithmetic addition or subtraction on the address bits.

ADDRESS GENERATOR

In general, a primary feature of the invention is to display video data in a flexible manner with little software intervention. The Address Generator 12 fulfills this function. It has the capability of generating complex address sequences not only for a specific frame, but sequences of frames as well.

Additionally, the Address Generator 12 makes no assumptions as to the content of a displayed 'frame'. Thus, a 'displayed frame' is no longer restricted to the 'captured spatial frame' of the original recording. One may, if desired, generate a 'display frame' which contains both temporal and spatial data, rather then the conventional spatial data alone. Furthermore, the desired frame format need only be defined at run-time; the display format is not part of the design. The same flexibility allows one to also display multiple frames from different parts of memory at the same time.

The purpose of the Address Generator is to allow for a flexible means of displaying video data, regardless of its organization in the Frame Buffer 26. To achieve this, the Address Generator 12 relies on two principle functional blocks, the Mapping Ram 20, and the Address Manager 22.

The Mapping Ram 20, for example, is a 256k×32 bit ram, and is used to hold the VME address of each pixel in the 512×512 video area of video display 10. During the program mode of the Address Generator 12, MAPPING RAM 20 is serially accessed by a sequence of writes to setup the VME address of each pixel. These addresses are supplied by the host computer in a rasterized form. During the non-program mode of the Address Generator 12, these addresses are serially read back by hardware and passed to the Address Manager 22, which then places a modified version of the address onto the VME bus to access each pixel. Up to four consecutive pixels from the same VME long word can be detected to minimize, if possible, the number of VME accesses. Thus, there can be transferred up to four pixels at a time.

The Address Manager 22, in the example, takes each 32 bit address and modifies it according to several of its internal control registers. (There is a degenerate form of programming these registers which allows the addresses to be passed without modification.) There are three nondegenerate modes of operation for the Address Manager 22.

MODE 1: NON-AUTO PLAY

The first of these modes is used primarily for software to manually sequence frames. In this mode, a 32-bit mask register 36 is used. The address manager 22 simply OR's the 32-bits of the mask register 36 with the incoming address. The intended use of this function is to program a sequence of addresses into the Mapping Ram 20, with all of the bits of the frame field zeroed. Upon receiving a control signal, the software can then program the mask register 36 with the value of the next desired frame. As this is OR'd with the mapping addresses, the combination will address the appropriate pixels of the appropriate frame. Note that the frame field need not be in contiguous address bits.

More display flexibility is achieved by using fields other than the frame field of the address. For example, one can program the Mapping Ram 20 with the address sequence describing the repeated scan of a given row of pixel data for 512 consecutive frames, with the actual row field of the address zeroed out. By subsequently programming the mask register 36 with the appropriate row of pixels desired upon a control signal, one can immediately scan another row without having to reprogram the Mapping Ram 20.

MODES 2 AND 3: AUTO-PLAY MODES

The Auto-play modes are the most important modes and provide the most unique features. The three registers 34, 36, 38 from the Address Manager 22 used in this mode define its operation. To make clearer the operation during this mode, the basic responsibilities of these registers are generalized here before their specific discussions below.

Before video playback, four questions must be answered. These are:

Q1. From which frame should we play back?

Q2. What should the next frame be?

Q3. When should the next frame be displayed?

Q4. What should change between the frames?

A1. The frame which the playback session should start is held in the sum register 38 before the play commences. At any time thereafter, the sum register 38 holds the identity of the current frame.

A2. The next frame to be displayed is determined by the value of the delta register 34. However, the word frame should not be interpreted as one normally thinks of a frame of video data, but rather one of many possible ways in which temporal spatial video data can be displayed.

A3. The time for the next frame update is determined by the play rate register of the Play Rate controller 25.

A4. The item which should change between successive frame updates is determined by the mask register 36. This item is not only restricted to the normal concept of a particular frame number, but rather can also be a parameter such as a row, column, or even combinations of these.

MODE 2: AUTO-PLAY

The second of these modes is used for a software-less auto-play, in which the address generator automatically skips the desired number of frames without any software intervention. To perform this function, the Address Manager 12 uses the delta register 34 and the sum register 38.

In this auto-play mode, the mask register 36 no longer serves as a simple 32-bit register to be OR'd with the incoming addresses, but rather is used to denote the bits of the address which comprise a given numeric field (e.g.: frame, row, etc.). The sum register 38 is used to hold the total value for the selected numeric field. The delta register 34 is used to hold a numeric constant which is to be added to this field upon every frame update.

Thus, by isolating the desired numeric field, such as the frame field, with the mask register 36, and initializing the sum register 38 with a desired initial condition, such as frame 12, and programming the delta register 34 with a desired offset, such as four frames, one can automatically cause the display of every fourth frame upon every frame update cycle, starting with frame 12. (Actually, the first frame to be fetched from memory corresponds to the sum of the sum register 38 with the delta register 34. Thus, for this example, the actual first frame displayed would be 12+4=16.) As in the earlier mode described above, the bits of the field need not be contiguous. However, since numerical operations are being carried out on the data, there is an assumption on the ordering of the significant bits of the field. The least significant bit of the numeric field is assumed to be the lowest bit flagged in the mask register 36, and the most significant bit of the numeric field is assumed to be the most significant bit flagged in the mask register 36.

In the case where the numeric field is not contiguous, special logic resides in the Address Manager 12 to propagate the carry to the next highest significant 'cluster' of bits. There is no limit as to the number of these 'clusters' for any given field. Any address data between these clusters remains unaffected. Thus, for all intents and purposes, the isolated field behaves like a contiguous N-bit register, where N can be anywhere from 0–32.

Additionally, in the auto-play mode, numerical operations also occur on a pixel by pixel level (over and above the frame by frame operations described above). Recall, that the above described functions increments the numeric field by a specific amount for each frame, resulting in a constant which is fixed for the duration of the frame. This constant is then used on a pixel by pixel basis during the following frame. The constant is added to the specified numeric field of the pixel address obtained out of the Mapping Ram 20. Note that this operation neither modifies the contents of the Mapping Ram 20 nor the value of the constant for successive pixels. This operation continues independently for each pixel in the frame. As in the case of the frame by frame operations of this hardware, the carries are propagated over gaps in the numeric field during the pixel by pixel operations as well.

MODE 3: MANUAL-AUTO-PLAY

This mode is actually a special case of mode 2. This mode is selected by programming in the maximum frame rate. This corresponds to a value, for example, of $FF, which should normally indicate that a frame update should be generated for each refresh interval. However, this setting (which in all reasonable cases would not be possible due to the time it takes to update a frame versus refresh one) causes the Address Generator 12 to assume the manual-auto-play mode.

In this mode, the host computer can rely on all of the frame address calculation facilities as in the normal auto-play mode, with the exception that the frames are updated upon demand by the host. In this manner, the address generator 12 will support update rates which are either irregular or not an integer sub-multiple of the refresh rate.

Referring again to FIGS. 1 and 2, there will be described the transformation of a logical screen address of video display 10 to a physical frame buffer address. This transformation involves only the ADDRESS COUNTER 14, the MAPPING RAM 16, and the ADDRESS MANAGER 22 functional blocks. Therefore, the following detailed discussion will be limited to these three areas.

ADDRESS MANAGER

Figure 3:
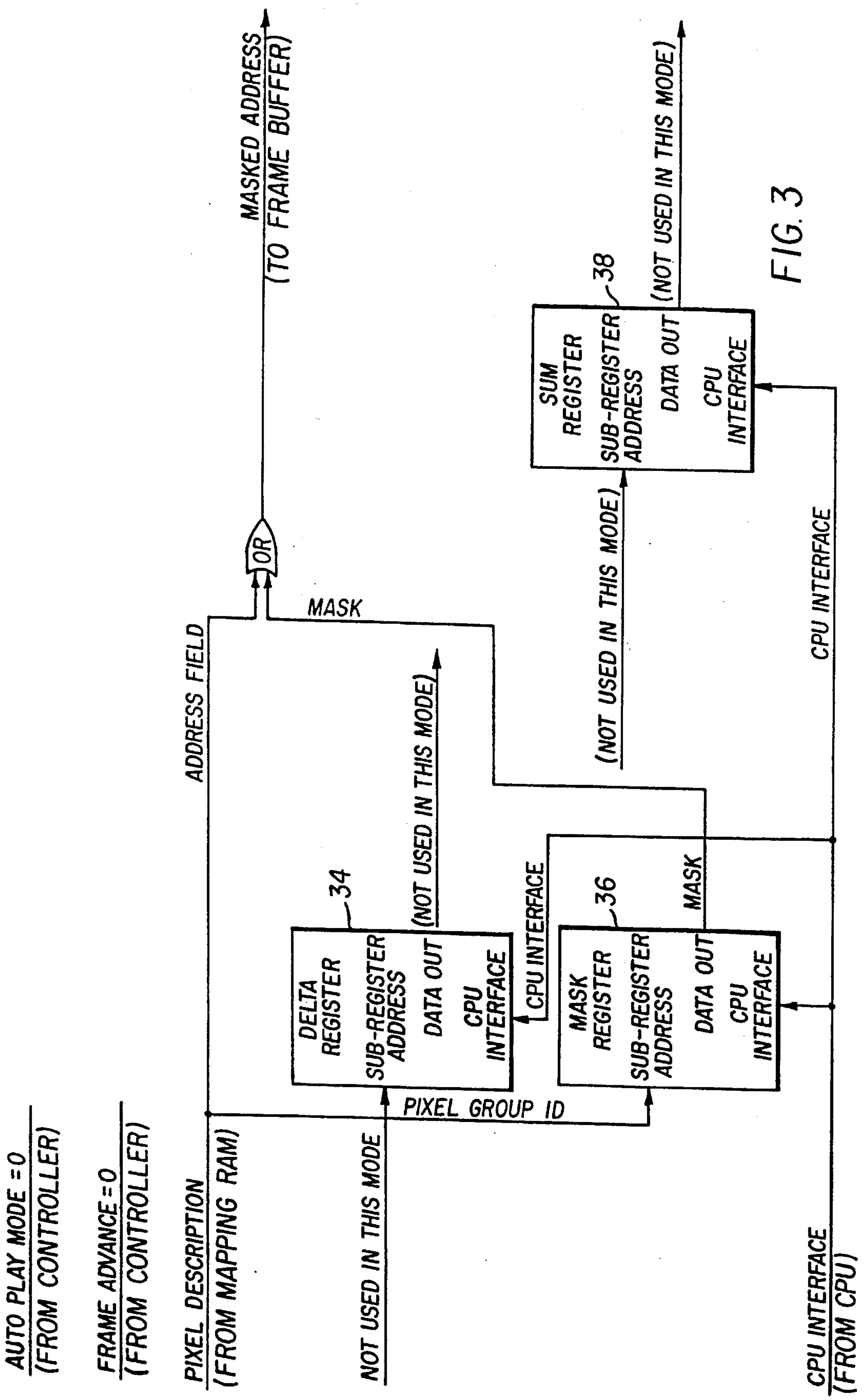
FIGS. 3–5*b* are several degenerate block diagrams of the address manager of FIG. 2 useful in explaining different operating modes thereof.
Figure 4:
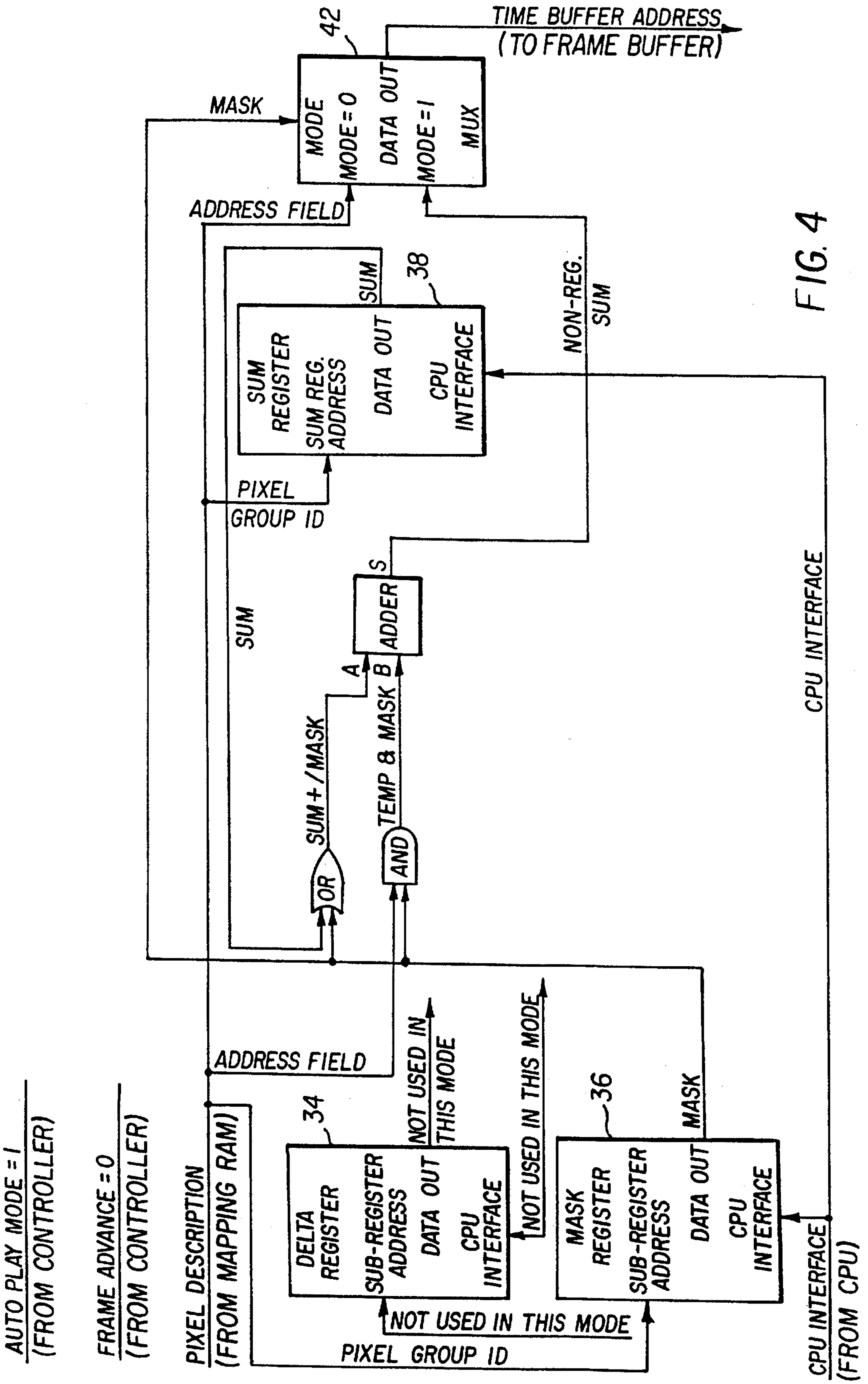
Figure 5:
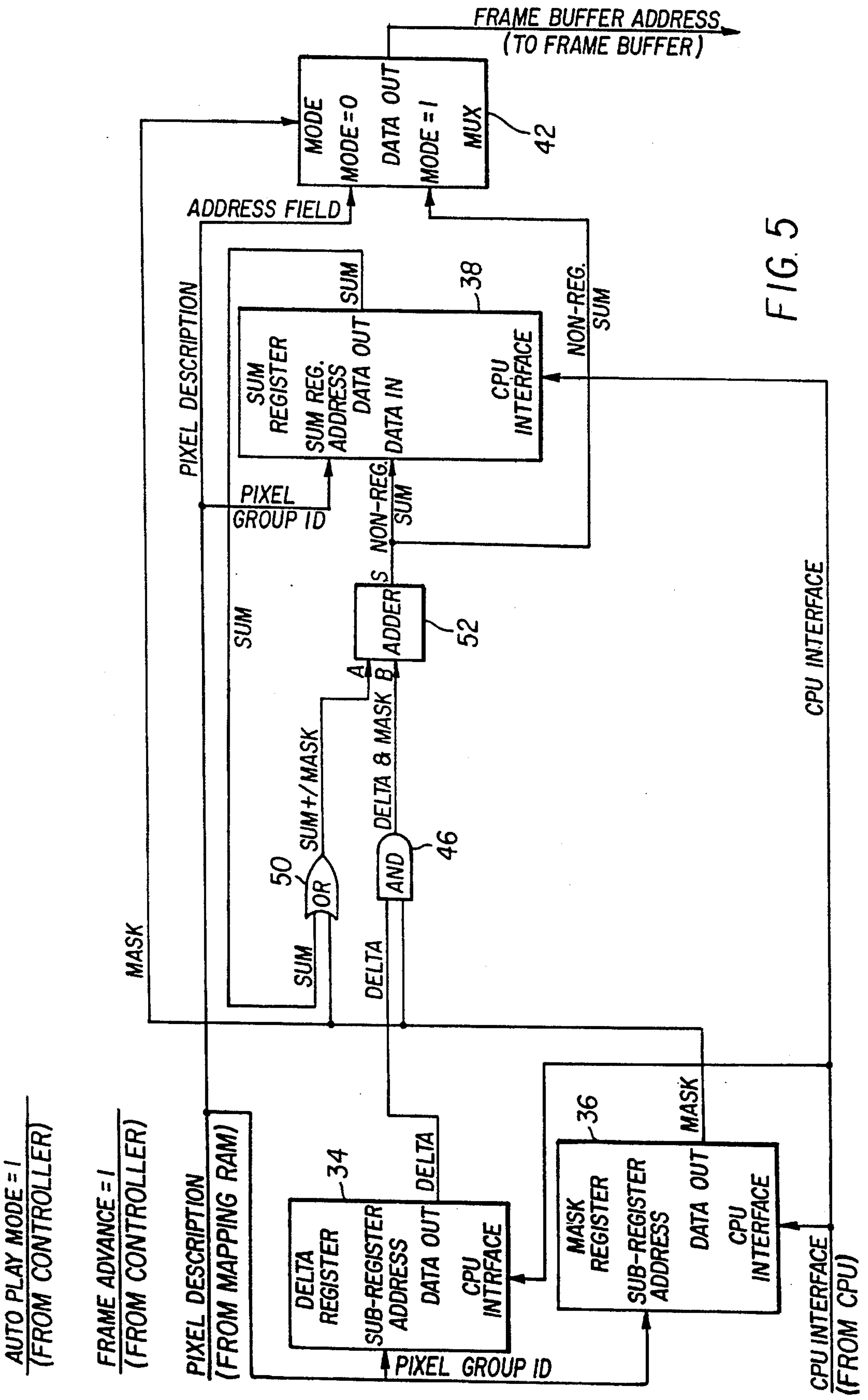

The ADDRESS MANAGER 22 is schematically described in the FIGS. 2–5. For each numbered figure, there also exists an 'a' and 'b' figure as well. These different figures are provided to simplify the description of the ADDRESS MANAGER 22. FIG. 2 describes all of the features of the ADDRESS MANAGER 22, while FIGS. 3–5 are degenerated versions of FIG. 2 in the ADDRESS MANAGER's various operational modes. Thus, we have:

FIG. 2: for all operational modes

FIG. 3: for NOT AUTO PLAY and NOT FRAME ADVANCE

FIG. 4: for AUTO PLAY and NOT FRAME ADVANCE

FIG. 5: for AUTO PLAY and FRAME ADVANCE Additionally, the 'a' figures represent the respective modes for only those bits which are not masked, while the 'b' figures represent the respective modes for the masked bits. Thus, we have:

'#' figures: for all bits

'#a' figures: for all UNMASKED bits

'#b' figures: for all MASKED bits

AUTO PLAY MODE ON/OFF

The AUTO PLAY MODE is controlled by a bit external to the ADDRESS MANAGER 22. When this bit is 'high', FRAME BUFFER 26 addresses are generated by the ADDRESS MANAGER 22 by arithmetic means. These calculations are performed on a pixel-by-pixel basis, until an entire display frame's worth of addresses are generated. At the end of this period, if the FRAME ADVANCE bit is asserted 'high', then the internal registers of ADDRESS MANAGER 22 are used to update themselves in preparation for the next frame. This also involves an arithmetic operation. By this means, the ADDRESS GENERATOR 12 can automatically calculate FRAME BUFFER 26 addresses for an entire sequence of frames, without any host CPU 18 intervention.

When the AUTO PLAY MODE bit is 'low', FRAME BUFFER 26 addresses are generated by a simple logical operation. This option does not have a FRAME ADVANCE option. Thus, the host CPU 18 must provide the information necessary to the ADDRESS MANAGER 22 for each frame to be displayed. However, the necessary information is all contained in the contents of one register, the MASK REGISTER 36. Thus, this minor intervention by the CPU 18 is kept to a minimum.

ADDRESS MANAGER REGISTERS

The ADDRESS MANAGER 22 uses a set of three registers for each implemented PIXEL GROUP to do its work. As each unique combination of settings of these registers effectively changes both the temporal nature of their respective pixels in addition to the FRAME BUFFER 26 addresses generated, different display modes as well as imagers are accommodated. By assigning different PIXEL GROUP IDs to different display pixels in the MAPPING RAM 20, the behavior of a window within the display 10 can be controlled simply by modifying the respective set of registers in the ADDRESS MANAGER 22. These registers are:

* the MASK register 36,
* the DELTA register 34,
* the SUM register 38.

The purpose of these registers is a function of the basic operating mode of the ADDRESS MANAGER 22 as follows:

NOT AUTO PLAY and NOT FRAME ADVANCE (FIGS. 3, 3*a*, 3*b*):

* MASK register 36: The MASK register 36 is simply bit-wise OR'd with the ADDRESS FIELD portion of the PIXEL DESCRIPTOR to generate the FRAME BUFFER 26 address.
* DELTA register 34: not used in this mode
* SUM register 38: not used in this mode AUTOPLAY and NOT FRAME ADVANCE (FIGS. 4, 4*a*, 4*b*):

* MASK register 36: The MASK register 36 is used to mark the respective bits of the ADDRESS FIELD of the PIXEL DESCRIPTOR as belonging to a numeric field. (See FIG. 4*b*). All calculations done by the ADDRESS MANAGER 22 in this mode will only affect the bits designated by this register. If non-contiguous bits are defined by the MASK register 36, the marked bits will still act as though they were one contiguous numeric field.

Those bits which are not masked are simply passed from the ADDRESS FIELD of the PIXEL DESCRIPTOR to the respective bit of the BUFFER address. (See FIG. 4*a*)

Figure 4A:
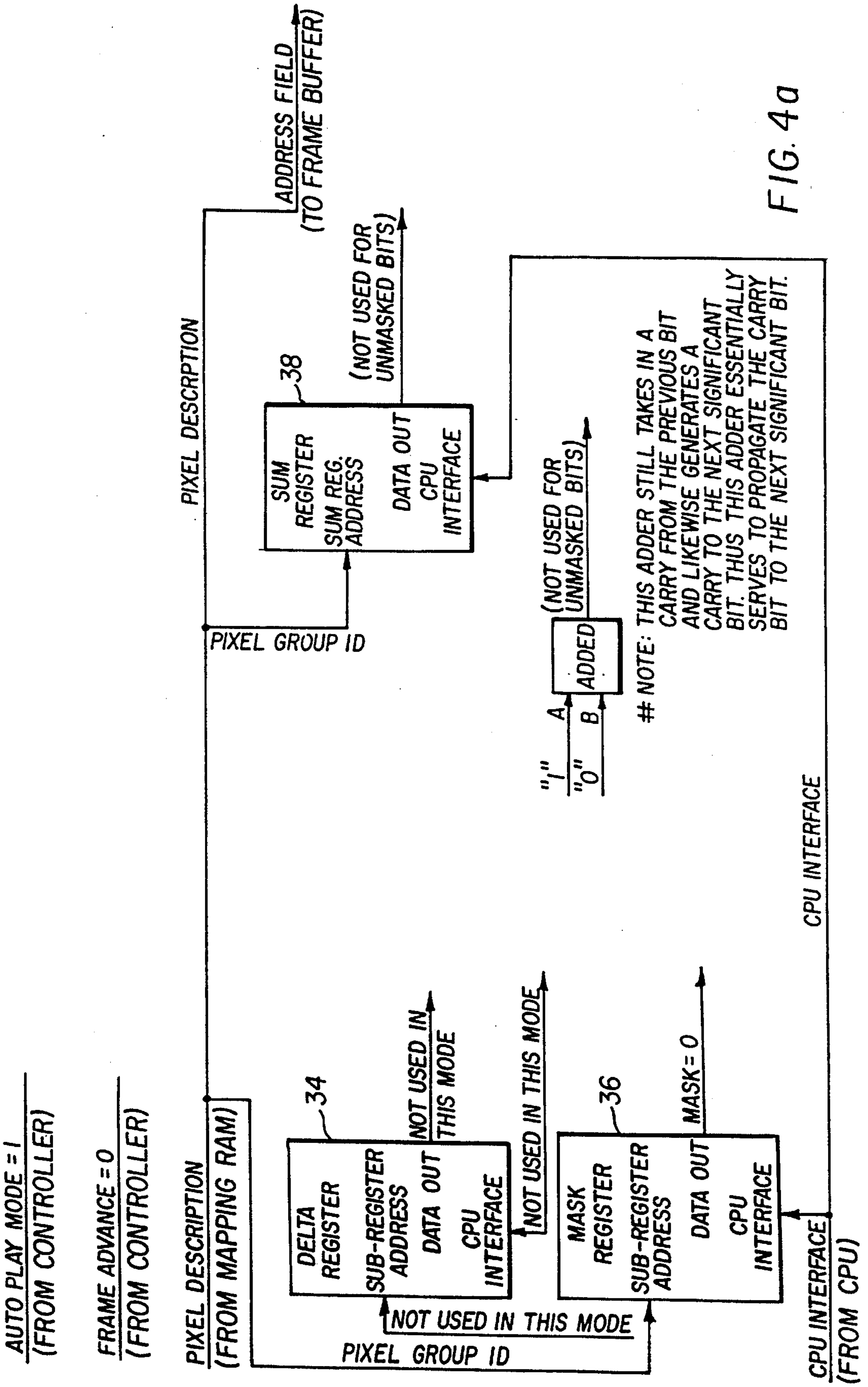
Figure 4B:
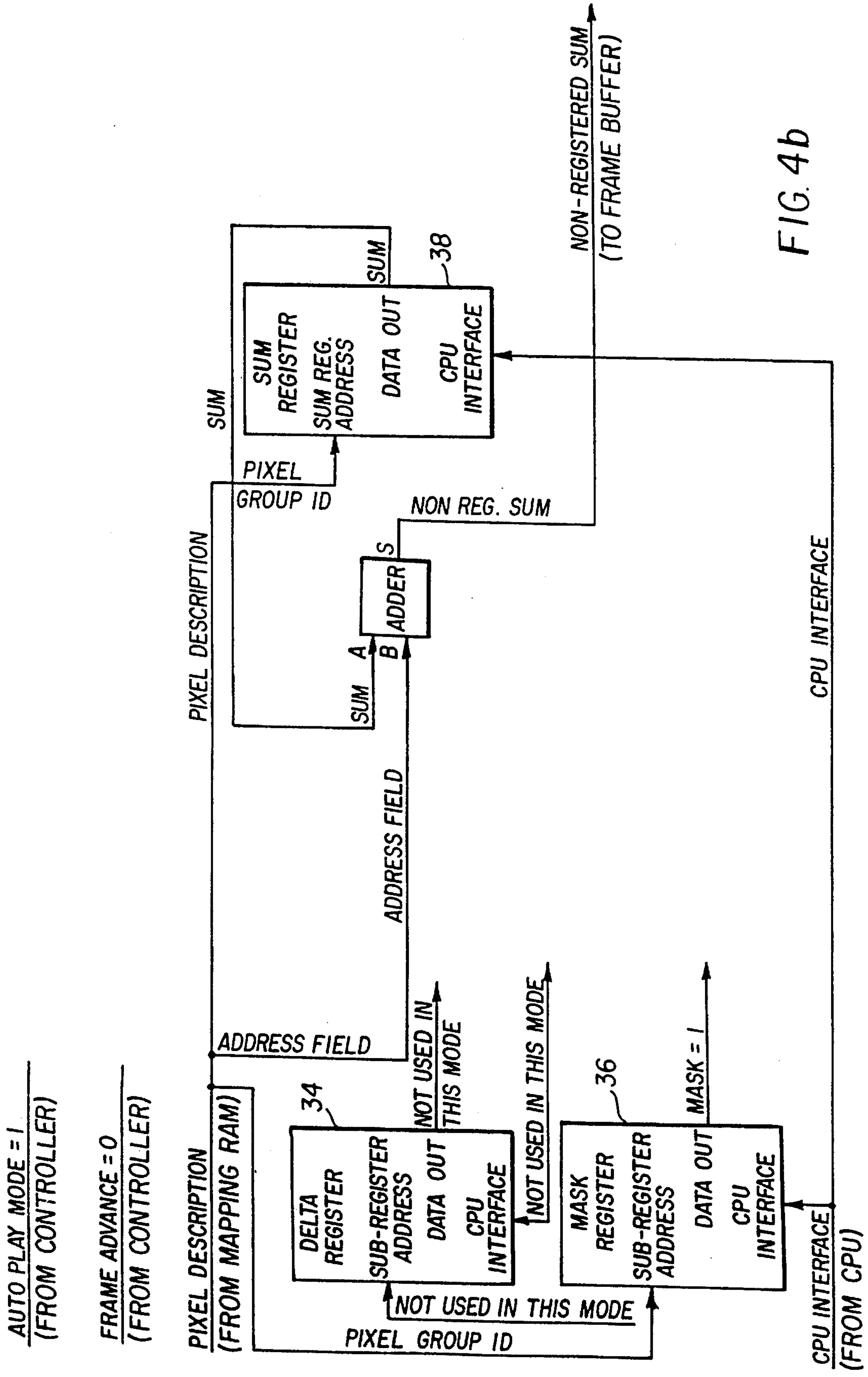

* DELTA register 34: not used in this mode
* SUM register 38: The SUM register 38 is not used for unmasked bits (FIG. 4*a*). However, for masked bits, the respective bits of the ADDRESS FIELD of the PIXEL DESCRIPTOR in used by adding it with the current value stored in the SUM register 38 to generate the FRAME BUFFER 26 address (FIG. 4*b*).

Figure 5A:
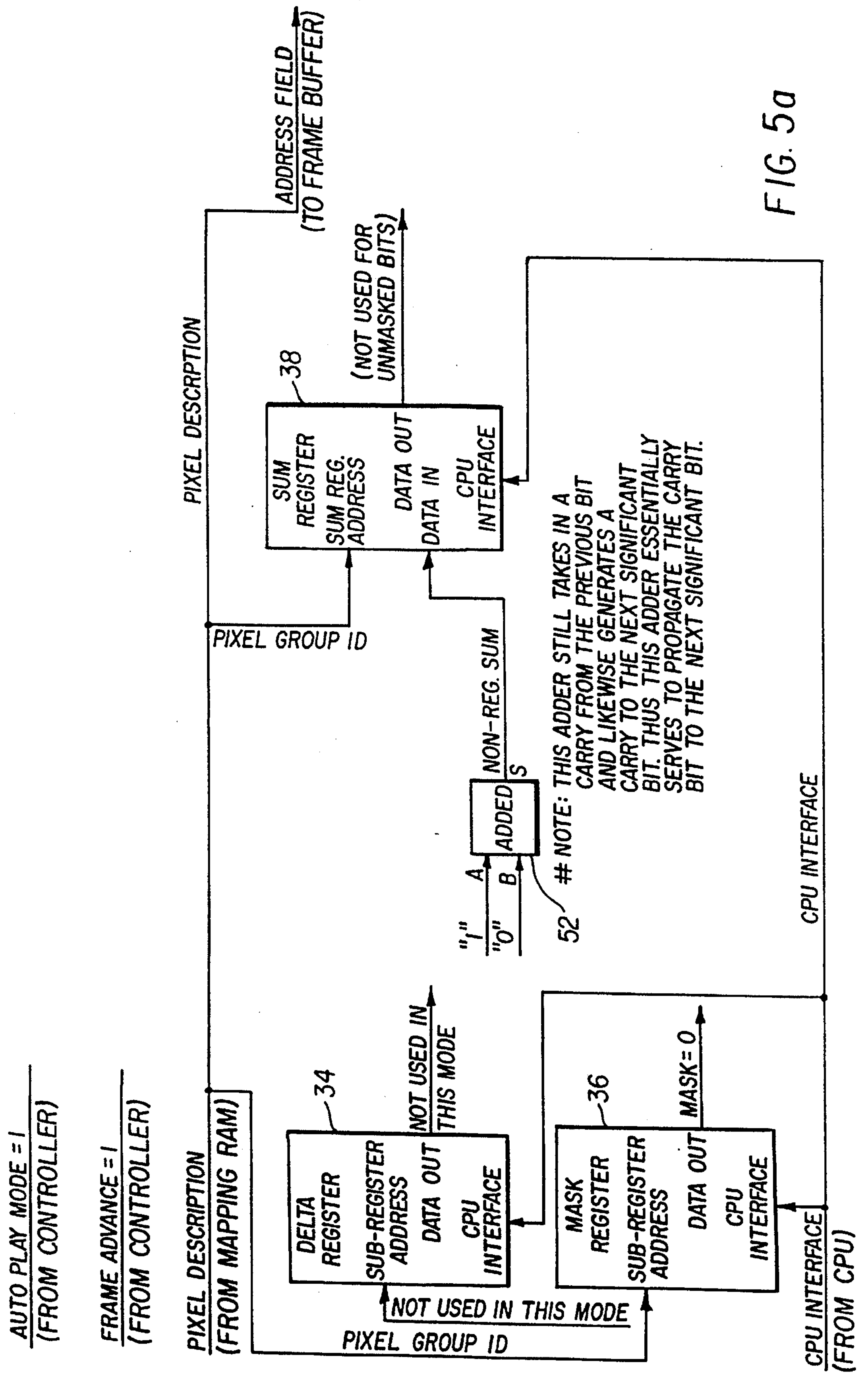
Figure 5B:
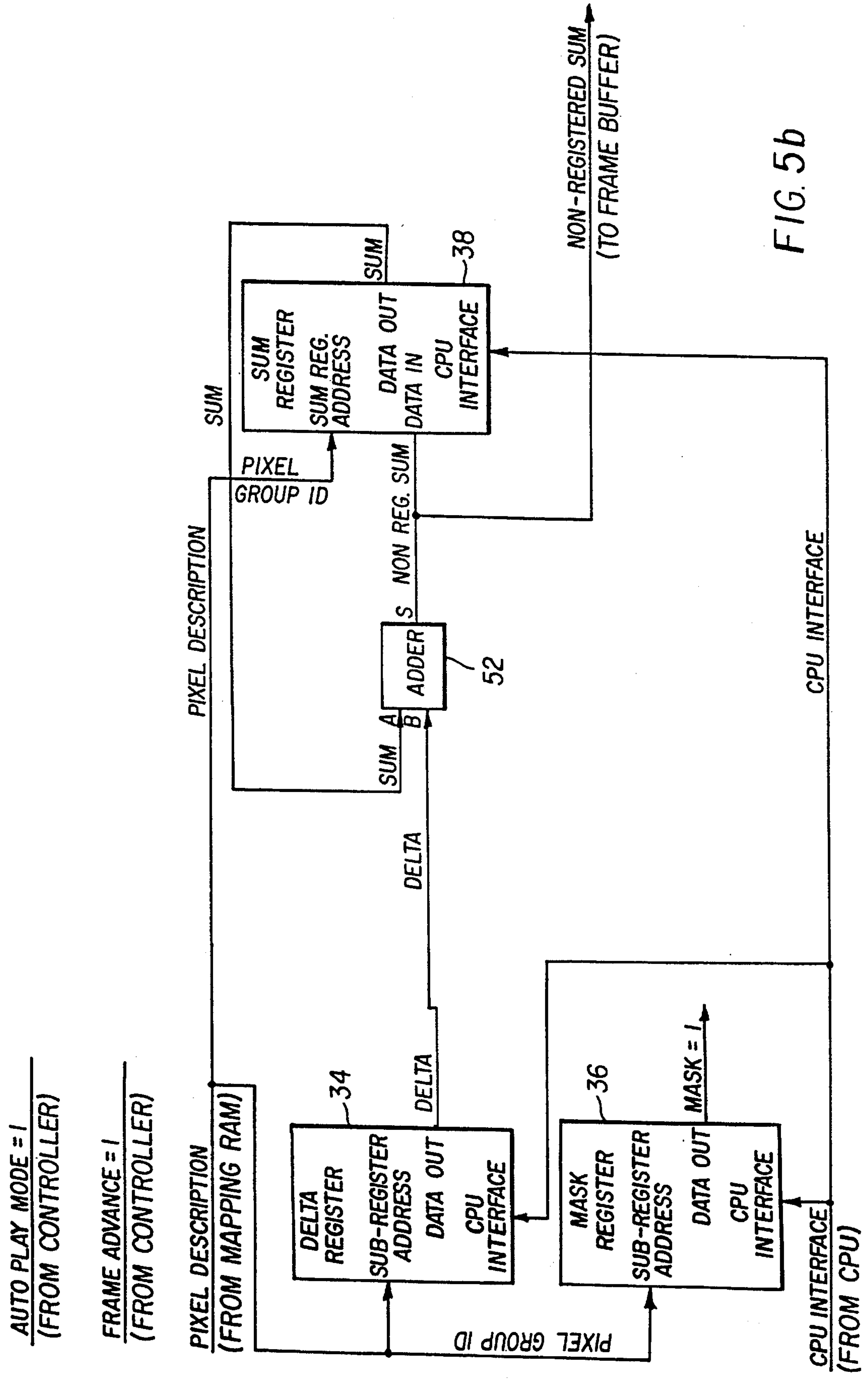

AUTO PLAY and FRAME ADVANCE (FIGS. 5, 5*a*, 5*b*:

* MASK register 36: The MASK register 36 is used to mark the respective bits of the ADDRESS FIELD of the PIXEL DESCRIPTOR as belonging to a numeric field. Its role is identical to the one defined above for the AUTO PLAY and NOT FRAME ADVANCE mode.
* DELTA register 34: The DELTA register 34 is not used for unmasked bits (FIG. 5*a*). However, for masked bits, the respective bits of the DELTA register 34 are used by adding them with the value stored in the SUM register 38 (FIG. 5*b*). This result is stored back into the SUM register 38. This is identical to the AUTO PLAY and NOT FRAME ADVANCE mode, with the exception that the data to be added to the SUM register 38 data comes from the DELTA register 34 rather than the ADDRESS FIELD of the PIXEL DESCRIPTOR, and the result gets stored back into the SUM register 38 rather than output as a FRAME BUFFER 26 address.
* SUM register 38: The Sum register 38 is not used for unmasked bits (FIG. 5*a*). However, for masked bits, the respective bits of the DELTA register 34 are used by adding them with the value stored in the SUM register 38 (FIG. 5*b*). This operation is fully described above under the DELTA register description.

ADDRESS MANAGER MODES

The three modes of the ADDRESS MANAGER 22 will now be described in detail. The following sections will further describe any interactions between the various registers within the ADDRESS MANAGER 22.

Figure 3A:
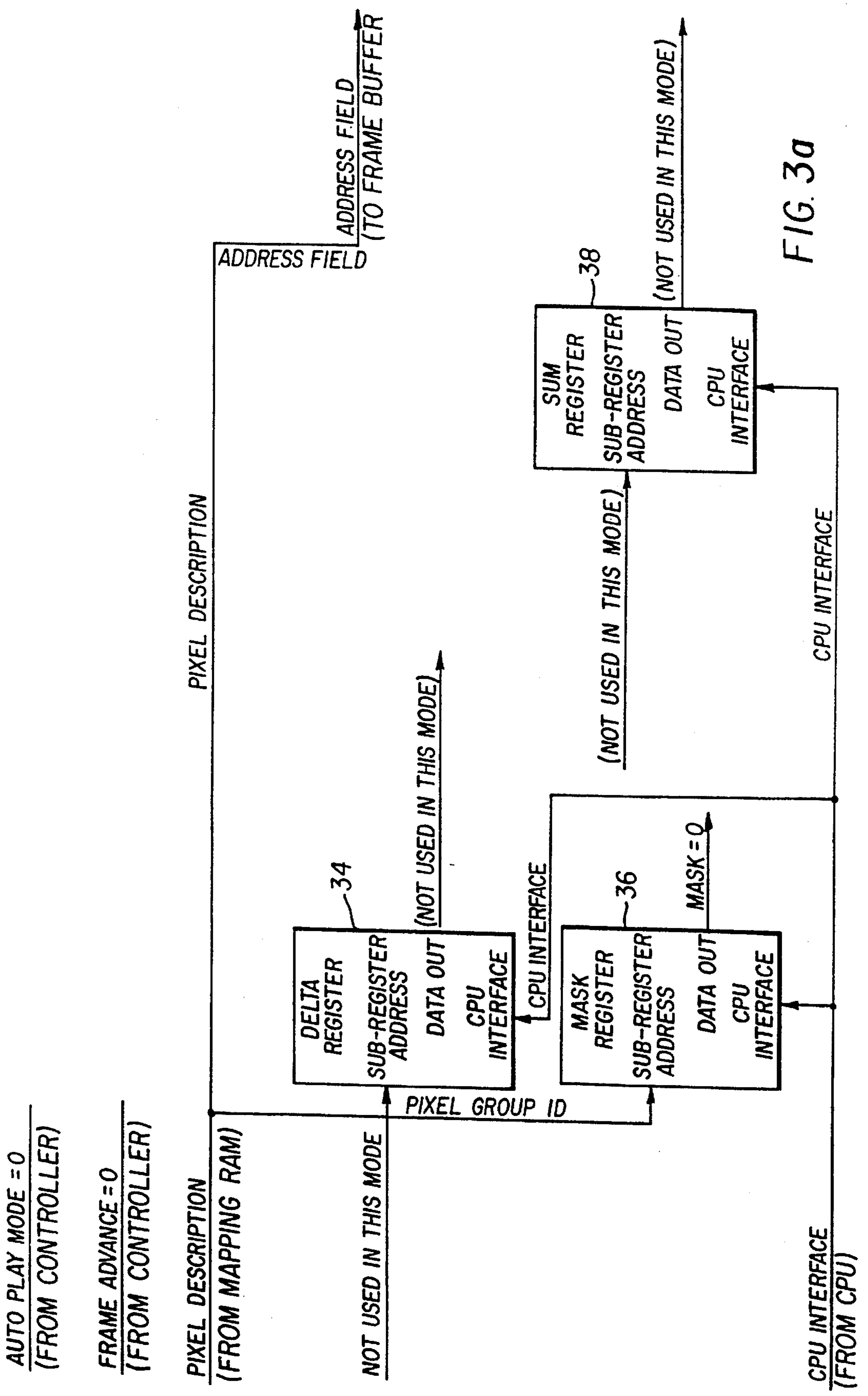
Figure 3B:
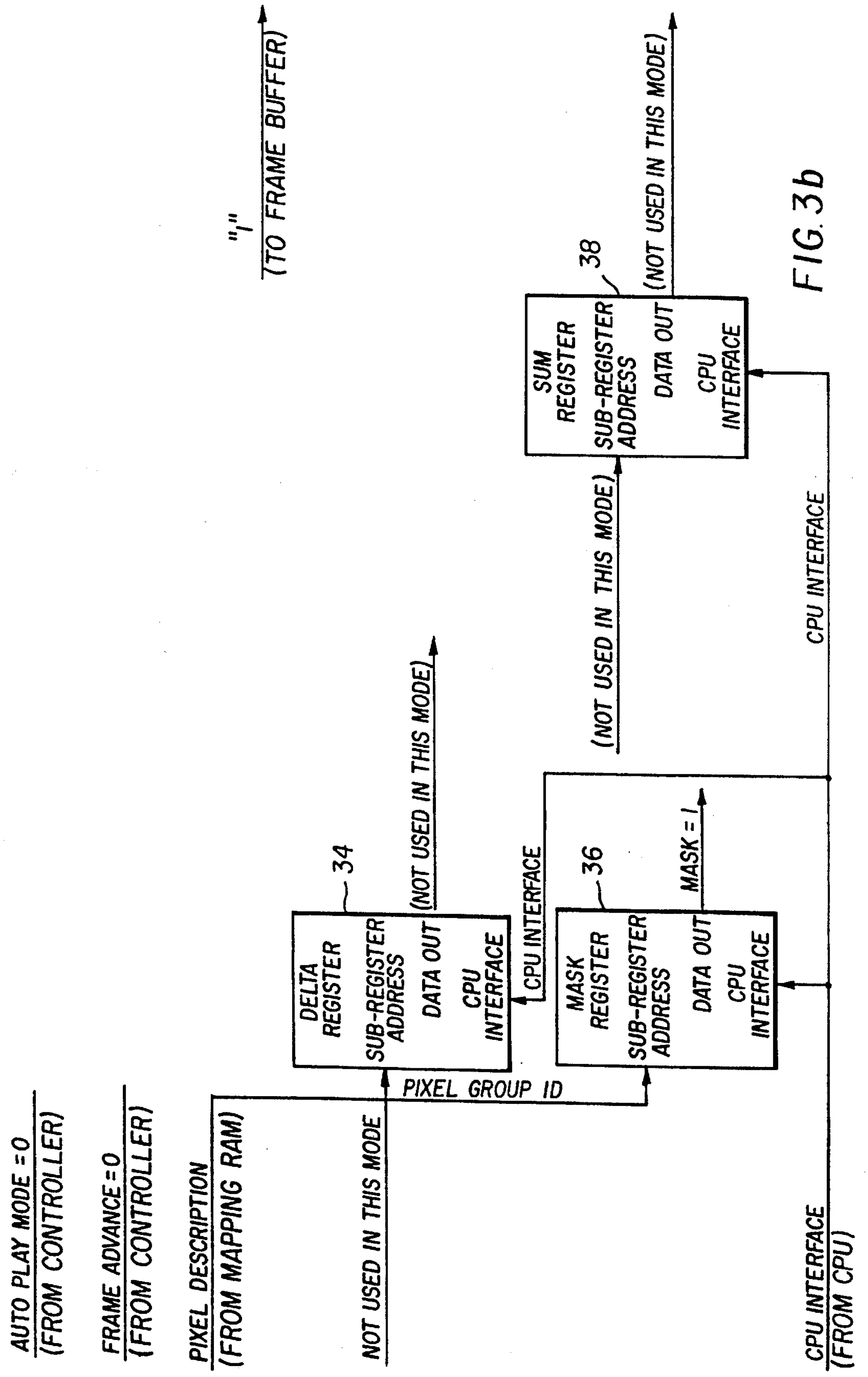

NOT AUTO PLAY and NOT FRAME ADVANCE (FIGS. 3, 3*a*, 3*b*):

In this mode, the contents of the MASK register 36 is simply bit-wise OR'd with the ADDRESS FIELD of the PIXEL DESCRIPTOR in OR gate 48 (See FIG. 3). Another way of viewing this operation is by observing that every MASKed bit generates a corresponding '1' bit in the final FRAME BUFFER 26 address (FIG. 3*b*), while any unMASKed bit is determined solely by the contents of the ADDRESS FIELD of the PIXEL DESCRIPTOR (FIG. 3*a*). Thus, as soon as the CPU 18 can write a new value to the MASK register 36, an entirely new sequence of addresses can be generated by the ADDRESS MANAGER 22.

The expected mode of use of this feature is as follows. In many image capture systems, the nature by which the video data is stored in the BUFFER 26, particularly for sensor arrays whose individual channel(s) contain a number of pixels equal to an integral power of 2, is such that the address bits correlated to a given frame are exclusively contained in a fixed group of bits. That is to say that such a group of bits only contains information pertaining to the frame number wherein the addressed pixel was originally captured. Additionally, similar observations are commonly made to other address bits, as they might encode row or column information.

Such a group of bits can then be thought of as a numeric field which encodes the frame, row, or column information. When such a situation exists, this mode of operation can be used.

The implementation of this mode is best described by first imagining the contents of the MAPPING RAM 20 as containing the addresses needed to identify all of the pixels for a given desired frame, such as frame 0. Then imagine all of the address bits corresponding to the frame number field as being set to 0. This forms the ADDRESS FIELD portion of the PIXEL DESCRIPTOR which gets written to the MAPPING RAM 20. The PIXEL GROUP ID field for all of these pixels should be set to some unique PIXEL GROUP. All of this is done by the CPU 18 during initial configuration.

To cause a frame to be displayed, the CPU 18 then simply writes to the MASK register 36 corresponding to the preselected PIXEL GROUP with the desired pattern of bits, causing the frame bit field of the address to point to the desired frame. Each new write to the MASK register 36 effectively modifies all of the ADDRESS FIELDs stored in the MAPPING RAM 20, without actually making the changes permanent.

EXAMPLE

Suppose that we have successive entries in the MAPPING RAM 20 such that the values of PIXEL_GROUP_ID:ADDRESS FIELD for the first four pixels have the values of:

0h:0035h (0000_0000_0011_0101b)

0h:0036h (0000_0000_0011_0110b)

1h:2500h (0010_0101_0000_0000b)

1h:2600h (0010_0110_0000_0000b)

Subsequently, the CPU 18 writes the following values to the PIXEL_GROUP_ID:MASK register 36 (the other registers are irrelevant in this mode)

0h:2300h (0010_0011_0000-0000b)

1h:0005h (0000_0000_0000_0101b)

This would cause the immediate display of a new frame, where the first four pixels will be taken from the following FRAME BUFFER 26 addresses:.

2335h (0010_0011_0011_0101b)

2336h (0010_0011_0011_0110b)

2505h (0010_0101_0000_0101b)

2605h (0010_0110_0000_0101b)

AUTO PLAY MODE and NOT FRAME ADVANCE (FIGS. 4, 4*a*, 4*b*)

In this mode, FRAME BUFFER 26 addresses are arrived at by a combination of two methods. The MASKed bits get treated as a numeric field upon which arithmetic operations are carried out to determine its final value. The unMASKed bits are simply taken from the ADDRESS FIELD of the PIXEL DESCRIPTOR. This dual mode operation can be seen in FIG. 4.

Note the multiplexer (MUX) 42 at the far right of the diagram. We see that on a bit by bit basis, the MASK bit is used to select between one of two possible outputs for that bit to generate the FRAME BUFFER ADDRESS. For unMASKed bits, the result simply is taken from the ADDRESS FIELD of the PIXEL DESCRIPTOR, while the MASKed bits are a result of the addition between the SUM register 38 and the ADDRESS FIELD of the PIXEL DESCRIPTOR, resulting in the value called NONREGISTERED SUM.

The way that the NON-REGISTERED SUM is calculated deserves some explanation. Note in FIG. 4 how one input A to the ADDER 52 is the quantity (SUM+/MASK), and the other input B is (ADDRESS FIELD & MASK). Note that these quantities; for MASKed bits, that is with its MASK bit set to '1', degenerates to the quantities of (SUM+/1)=(SUM), and (ADDRESS FIELD & 1)=(ADDRESS FIELD). For unMASKed bits, these quantities degenerate to (SUM+/0)=(1), and (ADDRESS FIELD & 0)=(0).

Thus, for MASKed bits, the ADDER 52 sums the quantities of (SUM) and (ADDRESS FIELD), while unMASKed bits sums the quantities of (1) and (0). The reason for this is to support arithmetic operations for non-contiguous bit fields. To support non-contiguous bit fields, a carry generated from the MSB of one bit field must be propagated to the LSB of the next higher bit-field. This can be effectively done if the interstitial bits between these bit-fields is such that for one input of the ADDER 52 they are set to all '1's, and the other input is set to all 'O's. Thus, any carry bit generated out of the lower bit-field will be added to the 1 and 0 of the next bit up, effectively propagating the carry to successively higher bits.

The general equation for a carry_out from the sum of two bits a and b is given by the following equation, where the '&' implements a logical 'AND', and the '+' implements a logical 'OR':

$$\text{carry-out } \mathbf{32}\ (\text{carry\_in} \ \&\ a)+(\text{carry\_in} \ \&\ b)+(a \ \&\ b)$$

For the interstitial bit fields, a='1', and b='0' thus degenerating into the following equation:

$$\begin{aligned}\text{carry\_out} &= (\text{carry\_in} \ \&\ 1) + (\text{carry in} \ \&\ 0) + (1 \ \&\ 0)\\ &= \text{carry in} + 0 + 0\\ &= \text{carry\_in}\end{aligned}$$

Thus, the carry out bits are properly propagated between non-contiguous bit fields. Also note that for unMASKed bits, the previous calculation forced upon the ADDER 52 has no effect on the respective bit in the generated FRAME BUFFER 26 address (see the output of the ADDER in FIG. 4*a*). The ADDER 52 is safely used for these bits only to propagate the carry.

In summary, the MASKed bits are generated by a sum of the SUM register 38 and the respective ADDRESS FIELD in the PIXEL DESCRIPTOR, while the unMASKed bits are taken directly from the ADDRESS FIELD of the PIXEL DESCRIPTOR.

By expanding on the use scenario described for the previously described mode, we can demonstrate the increased utility of this mode. Two scenarios will be described, the first one of which is similar to the one described above, where a distinct address bit field exists to denote a specific quantity, such as the frame number.

SCENARIO 1: DISTINCT ADDRESS BIT FIELDS

Let us say that we want to display a composite image taken from the recording of a single imager. However, we wish to display four different frames at a time on the screen in four windows, with each window being offset relative to the others. For sake of argument, each window will be offset by 10 frames. To implement this in the previous mode, four PIXEL GROUPs will need to be defined, and the CPU 18 will have to write to the MASK register 36 each of these four PIXEL GROUPs each time the screen needs to be updated. This is a particularly inefficient use of the PIXEL GROUPs as these are limited in any specific implementation.

This problem can be handled another way. Basically, one programs the MAPPING RAM 20 for each of the four windowed areas with the FRAME BUFFER 26 addresses corresponding to frame 0, 10, 20, and 30. All of the PIXEL GROUP ID numbers for these pixels are set to the same value. Now the CPU 18 simply writes to the SUM register 38 corresponding to the selected PIXEL GROUP with the offset desired, say 5. This will generate addresses for the display of frames 5, 15, 25, and 35 automatically. Note that each of the displayed frames were offset by 5 frames from the originally programmed settings in the MAPPING RAM 20. This is due to the effect of having programmed the SUM register 38 with the value 5.

Of course, the SUM register 38 could have been programmed with a negative quantity. In such a case, any numbers which would have generated negative numbers for their bit fields would essentially wrap around. Thus for a 10 bit frame bit field (which can address frames 0–1023), and a SUM value of –24, the ADDRESS MANAGER 22 will generate addressing for the frames 1000, 1010, 1020, and 6. Furthermore, any bias can be also incorporated into the ADDRESS FIELD on the PIXEL DESCRIPTOR as well. That is, the ADDRESS FIELD need not have been programmed for the frames of 0, 10, 20, and 30, but just as easily N+O, N+10, N+20, and N+30.

In either of the above operations, the effect of the SUM register 38 was to merely offset the frame numbers as originally programmed in the MAPPING RAM 20. Their relative relationships were left the same (that is, spaced by 10 frames between the four windows).

The difference between this mode and the previous mode is that now the CPU 18 only writes to one register to affect all four windows rather than four registers, and more PIXEL GROUPs are available for other uses, as only one was used in this example.

EXAMPLE

Suppose that we have successive entries in the MAPPING RAM 20 such that the values of PIXEL_GROUP_ID:ADDRESS_FIELD for the first four pixels has the values of:

0h:0135h (0000_0001_0011_0101b)

0h:0136h (0000_0001_0011_0110b)

1h:2503h (0016_0101_0000_0011b)

1h:2603h (0010_0110_0000_0012.b)

Subsequently, the CPU 18 writes the following values to the PIXEL_GROUP_ID:MASK register 36, 0h:FF00H (1111_1111_0000_0000B)

1h:00FFh (0000_0000_1111_111b)

The CPU 18 also writes the following values to PIXEL_GROUP_ID:SUM register 38, 0h:2300h (0010_0021_0000_0000b)

1h:0005h (0000_0000_0000_0101b)

This would cause the immediate display of a new frame, where the first four pixels will be taken from the following FRAME BUFFER 26 addresses:

2435h (0010_0100_0011_0101b)

2436h (0010_0100_0011_0110b)

2508h (0010_0101_0000_1000b)

2608h (0010_0110_0000_1000b)

SCENARIO 2: NON-DISTINCT BIT FIELDS

This mode presents a real problem with the first mode of operation, as the first mode relies on the fact that distinct address bit fields can be identified. In such a scenario, this mode must be used. This mode depends on a very common characteristic of the behavior of FRAME BUFFER 26 addresses as it relates to a specific quantity, whether that quantity is a frame number, row, or columns, or some other quantity realized in the address bits of a system. That is that in almost all cases, the difference in address between a given pixel and another pixel offset from it by a specific quantity, such as frame number, row, or column, is given by a fixed address offset.

In this scenario, the RAPPING RAM 20 is configured such that the addresses corresponding to one such desired frame (any one will do) are programmed in the ADDRESS FIELD of the PIXEL DESCRIPTOR. Furthermore, the MASK register 36 is programmed with all '1's. The SUM register 38 is then simply programmed by the CPU for each desired frame, with the value written into the SIIM register 38 equal to N*address_offset, where address offset is the predetermined offset between any two successive frames, and N is any desired integral value. The only caveat in using this mode is that the CPU 18 must know when any overflows will occur, as there is no means by which the ADDRESS MANAGER 22 can gracefully handle such an overflow, unlike the previous scenario.

EXAMPLE

Suppose that we have successive entries in the MAPPING RAM 20 such that the values of PIXEL_GROUP_ID:ADDRESS_FIELD for the first-four pixels has the values of:

0h:0035h (0000_0000_0011_0101b)

0h:0036h (0000_0000_0011_0110b)

1h:2500h (0010_0101_0000_0000b)

1h:2600h (0010_0110_0000_0000b)

Subsequently, the CPU 18 writes the following values to the PIXEL_GROUP_ID:MASK register 38

0h:FFFFh (1111_1111_1111_1111b)

1h:FFFFh (2111_1111_1111_1111b)

The CPU 18 also writes the following values to PIXEL GROUP ID:SUM register 38

0h:0132h (0000_0001_0011_0010b)

1h:0473h (0000_0100_0111_0011b)

This would cause the immediate display of a new frame, where the first four pixels will be taken from the following FRAME BUFFER 26 addresses:

0167h (0000_0001_0110_0111b)

0168h (0000_0001_0110_1000b)

2973h (0010_1001_0111_0011b)

2A73h (0010_1010_0111_0011b)

AUTO PLAY MODE and FRAME ADVANCE (FIGS. 5, **5*a*, 5*b***)

Note that in the previously described mode, the CPU 18, was involved in some register operation for each desired frame. However, the register which got modified in each of the above cases was always the SUM register 38. This additional CPU 18 burden is automatically taken care of by using a combination of modes. During the actual generation of addresses for the update of a given frame, the previous node is utilized. This is followed by the automatic operation of this mode, which effectively updates the value of the SUM register 38.

The degree to which the SUM register 38 is modified is controlled by the value of the DELTA register 34. As its name implies, the DELTA register 34 is added to the SUM register 38, and the result is then stored back into the SUM register 38. The rules concerning its operation with respect to the MASK register 36 is the same as previously described. In other words, the operation only gets performed on those bits MASKed by a '1', with the carry automatically propagated between non-contiguous bit fields (see FIGS. **5*a* and 5*b***). Additionally, negative numbers can be programmed for the DELTA value, thus allowing for a reverse playback mode.

In our particular implementation of the ADDRESS GENERATOR 12, the control circuitry automatically invokes this mode upon completion of a frame transfer to the updated VIDEO DISPLAY BUFFER 28,30. Thus, if the CPU 18 programs a '0' for the value of the DELTA register 34, the SUM register 38 will be left unmodified after each frame transfer. This will result in a behavior identical to that described above, which assumed only that the previous mode was used in isolation.

For a non-zero value of the DELTA register 34, however, the SUM register 38 will be automatically updated in time for the display of the next frame. In displaying the next frame, the ADDRESS MANAGER 22 will behave exactly as described in the previous mode, just as if the CPU 18 had actually done the calculation for the SUM register 38 itself.

EXAMPLE

Suppose that we have successive entries in the MAPPING RAM 20 such that the values of PIXEL_GROUP_ID:ADDRESS_FIELD for the first four pixels have the values of:

0h:0135h (0000_0001_0011_0101b)

0h:0136h (0011_0001_0011_0110b)

1h:2503h (0010_0101_0000_O111b)

1h:2603h (0010_0110_0000_0011b)

Subsequently, the CPU 18 writes the following values to the PIXEL_GROUP_ID:MASK register 38

0h:FF00h (1111_1111_0000_0000b)

1h:00FFh (0000_0000_1111_1111b)

Then the CPU 18 writes the following values to PIXEL_GROUP_ID:SUM register 38

0h:2300h (0010_0011_0000_0000b)

1h:0005h (0000_0000_0000_0101b)

Last, the CPU 18 writes the following values to the PIXEL_GROUP_ID:DELTA register 34

0h:0200h (0000_0010_0000_0000b)

1h:0004h (0000_0000_0000_0100b)

By activating the previous mode, this would cause the immediate display of a new frame, where the first four pixels will be taken from the following FRAME BUFFER 26 addresses:

2435h (0010_0100_0011_0101b)

2436h (0010_0100_0011_0110b)

2508h (0010_0101_0000_1000b)

2608h (0010_0110_0000_1000b)

Then by activating this mode, the PIXEL_GROUP_ID:SUM register 38 will be updated to the following values:

0h:2500h (0010_0101_0000_0000b)

1h:0009h (0000_0000_0000_1001b)

By reactivating the previous mode, we now would display the following for the first four pixels:

2635h (0010_0110_0011_0101b)

2636h (0010_0110_0011_0110b)

25OCh (0010_0101_0000_1100b)

26OCh (0010_0110_0000_1100b)

EXAMPLE OF IMPLEMENTATION OF THE INVENTION

Referring now to FIGS. 6 to 12 there is shown an example of an implementation of the invention as described above. FIGS. 1 and 2 will also be referred to in the following discussion. In the example to be discussed, the following assumptions are made: (1) The images stored in the frame buffer 26 are 4×4 pixels, four image frames 1–4 are stored; (2) The display 10 is 8×8 pixels and has five pixel groups (logical screens) 0–4; The ADDRESS MANAGER 22 has mask, sum, and delta registers 34, 36, 38 for each pixel group (i.e., five sets of registers).

The following implementation will be described. Pixel group 0—shrink by 2, increment by 1 frame; Pixel group 1—original size, increment by one frame; Pixel group 2—original size, stay still on frame 2; Pixel group 3—original size, vertical streak on one column, increment column with each update, starting with column 3; Pixel group 4—zoom middle by 2, decrement by one frame starting on frame 1.

Figure 6:
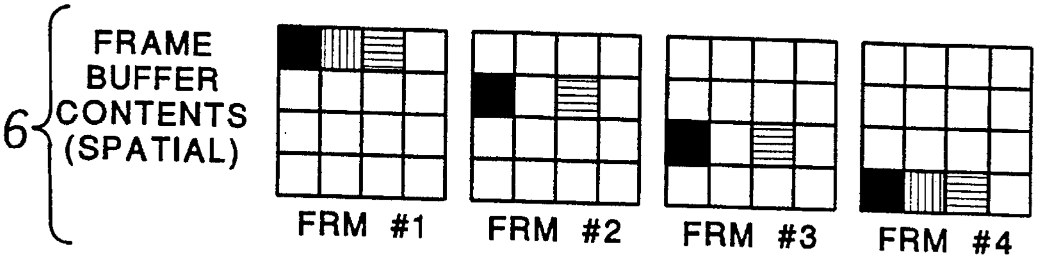
Figure 7:
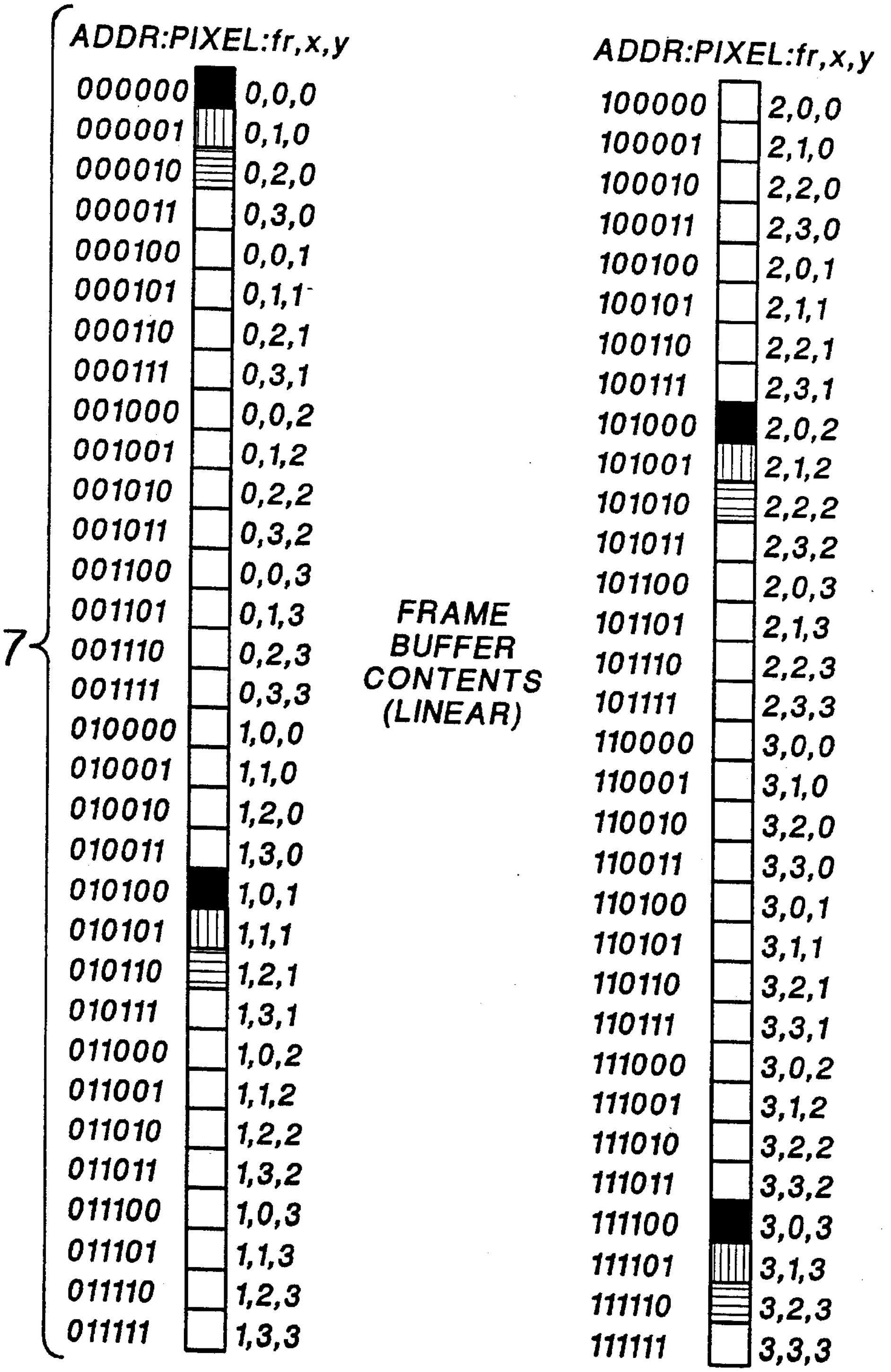

FIG. 6 shows the frame buffer 26 spatial contents, wherein image frames 1–4 capture a horizontal bar which moves vertically through the frames. FIG. 7 diagrammatically shows the frame buffer contents as a six bit address in the left hand column, a visual representation of the pixel in the middle column, and the pixel id by frame number, "x" or column, "y" or row (the upper left-hand pixel is designated location 0,0 and columns increase to the left and rows increase downwardly). For example, the pixel stored in frame buffer address 010101 is from frame 1 and is located in column 1 and row 1.

Figures 8, 9:
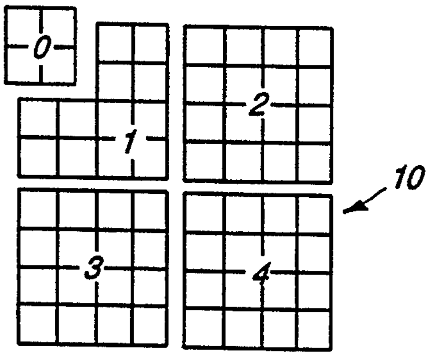

As shown in FIG. 8, the display frame layout is an 8×8 pixel spatial display. In the example, this 8×8 matrix is grouped into five pixel groups 0–4. FIG. 9 diagrammatically shows in tabular form the contents of the mapping ram 20 for the example shown. Each pixel in display 10 shown in FIG. 8 has a pixel descriptor stored in mapping ram 20. In the table shown in FIG. 9, the left hand column lists the address in Arabic numerals, the middle column lists the pixel descriptor, and the right hand column lists the x, y location on display 10. The pixel descriptor is further broken down into group id number and address field.

Figures 10, 11:
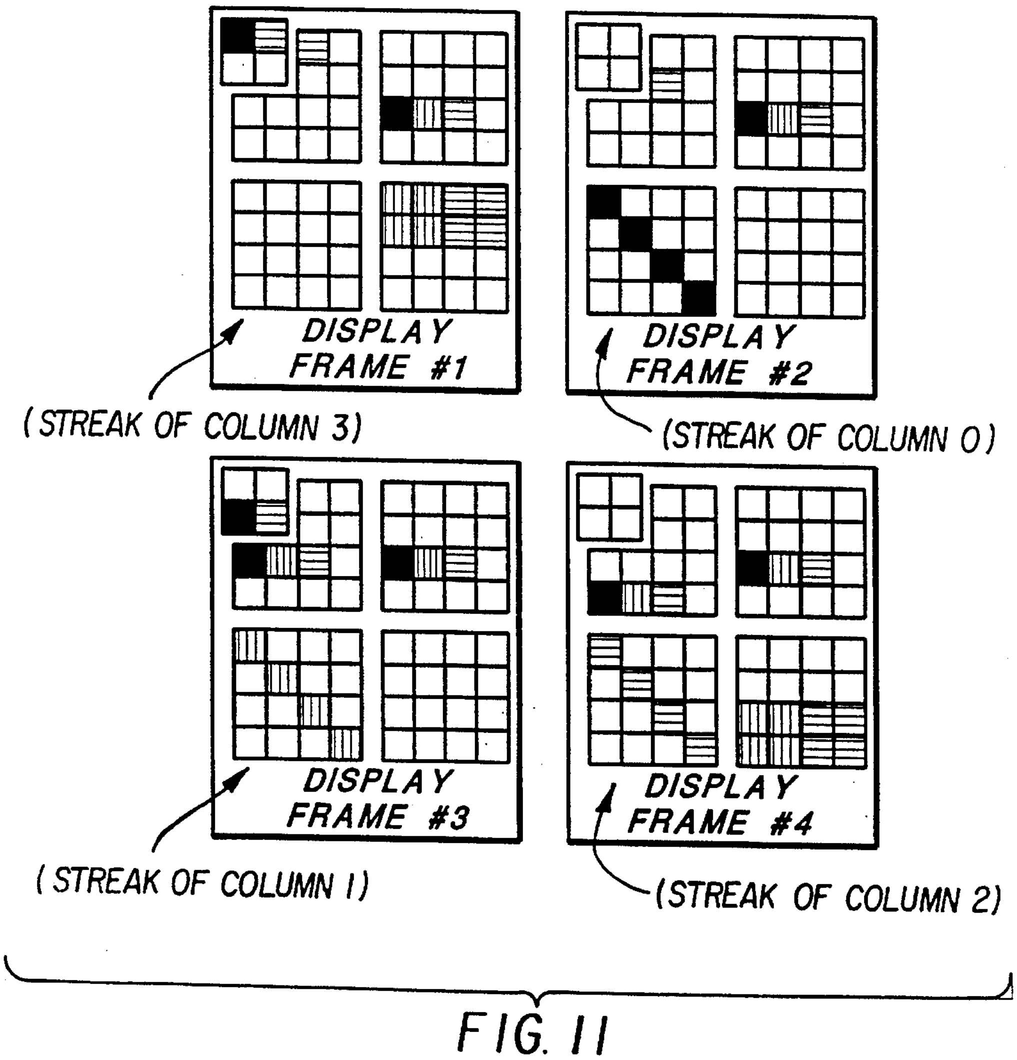

FIG. 10 shows the respective values stored in each of the mask, delta and sum registers for each pixel group 0–4 at the start of a display cycle. These values are repeated in the top box of FIG. 12. The next four boxes show the values of these same registers, respectively, after frame 1, after frame 2, after frame 3, and after frame 4, as displayed on display 10. FIG. 11 visualizes frames 1–4.

A PREFERRED MODE OF IMPLEMENTATION

Note that this disclosure only implements the ADDRESS GENERATOR 12 portion of a video display system. As such, any implementation of this ADDRESS GENERATOR 12 needs to also define the other component parts, as well as any interaction between them. Most of this can be inferred from the block diagram of FIG. 1. However, a few additional comments are needed to supplement this diagram in order to describe a preferred mode of implementation.

In such a system, a PLAY RATE CONTROLLER 25 is implemented. This PLAY RATE CONTROLLER 25 simply monitors some periodic signal, preferably the vertical synchronization signal from the VD CONTROLLER 24 to be able to mark time. This PLAY RATE CONTROLLER 25 will also have a register which programs the desired update rate of the display. This register will be programmed with the desired number of vertical sync cycles to be used for each displayed frame. Legal values will be from 1 to some upper number. A value of 1 essentially asks for a new frame to be displayed with each vertical sync period. Higher values will cause a proportionately lower update rate. A signal called FRAME REQUEST will be generated from this PLAY RATE CONTROLLER 25 for each update cycle. If a value of 0 is programmed into the update rate register, then the autostatic generation of a FRAME REQUEST signal should be defeated. However, by access to a control register called the MANUAL FRAME REQUEST register within the PLAY RATE CONTROLLER, the CPU has the ability to manually trigger the REQUEST signal.

This FRAME REQUEST signal should be passed to the main STATE MACHINE (not shown). The STATE MACHINE should, with each valid FRAME REQUEST, cause the ADDRESS COUNTER 14 to generate its sequence of addresses to address the MAPPING RAM 20 in a rasterized order. The PIXEL DESCRIPTORs thus generated will be passed through the ADDRESS MANAGER 22 and on to the FRAME BUFFER 26, where the pixels are fetched and stored in a VIDEO DISPLAY BUFFER 28,30. At this time, the STATE MACHINE will assert the ADVANCE bit if the AUTO PLAY mode is enabled, and do this for each of the possible PIXEL GROUPs implemented in the system. This will cause all of the respective registers in the ADDRESS MANAGER 22 for each PIXEL GROUP to be updated to the next appropriate value. At this time, the STATE MACHINE should also switch the VIDEO DISPLAY BUFFER 28,30 with the other VIDEO DISPLAY BUFFER 28,30 so that the new data can be displayed. Coincident with this, a TRANSFERRED INTERRUPT is generated to notify the CPU 18.

The CPU 18 then simply needs to initialize the MASK, DELTA, and SUM registers 34, 36, 38 as required, set up the UPDATE RATE register of the PLAY RATE CONTROLLER 25 as desired, and initially configure the MAPPING RAM 20. As soon as this is done, and if AUTO PLAY mode is enabled, then the CPU 18 no longer has to intervene in the entire operation. It may, of course, monitor the FRAME TRANSFERRED INTERRUPT to keep abreast of the display.

To implement non-uniform update rates, such as when single-stepping frames in response to a user key input, the CPU 18 has several choices, all of which involves programming the UPDATE RATE register to 0. The CPU 18 can put the ADDRESS MANAGER 22 into the NOT AUTO PLAY and NOT FRAME ADVANCE mode, and simply program the MASK register 36 to the desired value of each new frame, followed by an access to the MANUAL FRAME REQUEST register. Alternatively, the CPU 18 can use the AUTO PLAY and NOT FRAME ADVANCE mode, and program the MASK register 36 to the desired value, and the DELTA register 34 to 0. For each desired frame, the CPU 18 simply writes the desired value to the SUM register 38, and accesses the MANUAL FRAME REQUEST register.

The previous two methods has the advantage of allowing for a completely random access to frames. However, if the sequence of frames is uniform, but the update rate is not, the CPU 18 can use the AUTO PLAY and NOT FRAME ADVANCE mode, program the MASK register 36 to the appropriate value, the DELTA register 34 to the desired frame increment, and the SUM register 38 to the initial frame number. Thereafter, for each frame requested, the CPU 18 only needs to access the MANUAL FRAME REQUEST register. All frame to frame calculations will be automatically handled by the ADDRESS MANAGER 22.

TECHNICAL ADVANTAGE

This invention has applicability in the display of images on a video monitor, and especially in the multiple format display of multiple format source video images. The invention allows for the display of complex, multi-format sequences of video data without any intervention by the host CPU, save for the initial configuration of the sub-system. Through the software interface running on the host CPU, the user of the system can configure the display layout in terms of both the physical layout of the screen for any given displayed composite image (i.e., a display where multiple logical screens are displayed), as well as individual temporal characteristics for each logical screen within the composite image (i.e., the ability to control how each logical screen sequences the frame during playback. For example, one logical screen may display a still-frame, while another logical screen displays at a given playback rate, while a third logical screen smoothly scrolls into successive frames.)

The invention has been described in detail with particular reference to preferred embodiments thereof, but it will be understood that variations and modifications can be effected within the spirit and scope of the invention.

What is claimed is:

1. A video imaging system comprising:

an image memory for storing a plurality of images, wherein each of said images has a plurality of pixels;

a video display having a matrix of pixels;

a programmable address generator for producing a user defined sequence of display frames, each of which includes an ordered set of pixels from said image memory, and which is characterized by an ordered set of addresses, one for each display pixel, and an ordered set of pixel group identifiers, one for each display pixel;

wherein said address generator includes a) a programmable mapping memory for storing a pixel descriptor of each display pixel of a display frame, said pixel descriptor including a pixel group identification field, which identifies a group of pixels of said video display, and an address field which includes address information of said image memory of pixels to be displayed; and b) an address manager, which is linked to said mapping memory and said video display, and which has a set of registers and logic circuitry corresponding to each of said pixel groups of said mapping memory and said display, wherein each said set of registers includes a sum register, a delta register, and a mask register, the collective function of each said sets of registers and corresponding logic circuitry being to modify the address field of a pixel descriptor from said mapping memory to retrieve an image pixel stored in said image memory for display on said video display; and a control for controlling said video imaging system to sequentially read out said pixel descriptors from said mapping memory, and to process said address field of each read out pixel descriptor, by the pixel group set of registers and logic circuitry of said address manager, which corresponds to the pixel group identifier of said processed pixel descriptor, a) in a display mode, in which the mask register specifies bits of the address field, which may or may not be contiguous, to be modified, by adding the masked bits of the address field of the pixel descriptor to the respective bits of the sum register, by which process a modified address field is generated, whose unmasked bits are composed of the original and respective bits of the address field, and whose masked bits are generated as a result of the latter process; and b) in a frame advance mode in which the mask register specifies bits of the sum register, which are contiguous or not, to be modified, wherein the masked bits of the sum register are added to the respective bits of the delta register, to generate a modified value, whose unmasked bits are composed of the original address field bits and respective bits of the sum register, and whose masked bits are generated by the latter process.

2. The apparatus of claim 1 including an address counter which is linked to said mapping memory, and which is controlled by said control to serially address said mapping memory.

3. The apparatus of claim 1 including a video display buffer connected between said image memory and said video display for storing a display frame from said image memory, and a video display controller for reading out said display frame stored in said video display buffer for display on said video display.

4. The apparatus of claim 1 wherein said control includes a play rate controller for selectively controlling the playback rate of said video display.

* * * * *